(12) United States Patent
Nakao

(10) Patent No.: US 6,459,819 B1
(45) Date of Patent: Oct. 1, 2002

(54) IMAGE INPUT SYSTEM

(75) Inventor: Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/252,014

(22) Filed: Feb. 18, 1999

(30) Foreign Application Priority Data

Feb. 20, 1998 (JP) .......................................... 10-055850

(51) Int. Cl.$^7$ ................................................. H04N 7/18
(52) U.S. Cl. ..................................... 382/284; 382/276
(58) Field of Search ................................ 382/282–284, 382/276; 358/450

(56) References Cited

U.S. PATENT DOCUMENTS

| | | | | |
|---|---|---|---|---|
| 4,485,409 A | * | 11/1984 | Schumacher | 348/218 |
| 6,078,701 A | * | 6/2000 | Hsu et al. | 382/154 |
| 6,122,078 A | * | 9/2000 | Leberl et al. | 250/208.1 |
| 6,222,583 B1 | * | 4/2001 | Matsumura et al. | 345/619 |
| 6,249,360 B1 | * | 6/2001 | Pollard et al. | 358/473 |

FOREIGN PATENT DOCUMENTS

| | | |
|---|---|---|
| JP | H6-259557 | 9/1994 |
| JP | 6-259557 | 9/1994 |
| JP | 8-65483 | 3/1996 |
| JP | H9-218941 | 8/1997 |
| JP | 9-218941 | 8/1997 |
| JP | 10-49681 | 2/1998 |

OTHER PUBLICATIONS

Y. Okada et al., "A Hand–Scan Image Digitizer with an Ability for Realtime Assembling of Mosaic Pictures", Technical Journal IE81–17, IEICE, 1981, pp. 1–6.

L.G. Brown, "A Survey of Image Registration Techniques", ACM Computing Surveys, vol. 24, No. 4, Dec. 1992, pp. 325–376.

"Image Analysis Handbook", Tokyo University Press, 1991, pp. 462–467.

Soken–Suppan, Computing Image Processings: Application and Practice II, 1991, pp. 157–182.

Shohkohdoh, "Image Processing Handbook", 1987, pp. 252–254.

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

To provide an image input system which enables to obtain a high-precision composite image at high speed with an easy operation from divisional images taken from an object, through calculating positional relations among the divisional images at high speed and with high precision by making use of the characteristic of the image input operation; an image acquisition indicating means (112) generates an image acquisition indication referring to a present position of a camera (110) detected by a position detector (110). Each of the divisional images is acquired according to the image acquisition indication automatically at fixed intervals so as to have an overlap with another of the divisional images and stored together with attribution information and acquisition condition of the divisional image. A positioning parameter determining means (114) selects a most appropriate correction parameter of the position of the divided image to be synthesized in the composite image according to candidate parameter set nominated according to the acquisition condition.

22 Claims, 13 Drawing Sheets

IMAGE INPUT SYSTEM

BACKGROUND OF THE INVENTION

The present invention relates to an image input system for obtaining image data to be processed in a computer, and particularly to a image input system which enables to obtain image data of a desired scope through synthesizing data of sequences of partial images (hereinafter called divisional images) of an object taken by an image input device into data of a composite image of the desired scope.

Image input devices applied for obtaining image data to be processed in a computer can be grouped into two categories, electric still cameras and image scanners.

The electric still camera, which can take an image with one shot, has superiority in its portability and handiness, without needing any mechanical structure for scanning the object. On the other side, the electric still camera, resolution thereof depending on a limited number of pixels of its area sensor, has a problem that sufficient resolution cannot be obtained when the object size is large, or the object size should be limited for obtaining necessary resolution. Therefore, the electric still camera is regarded as inadequate for obtaining image data of precise pictures such as character documents or drawings.

The image scanners can be further classified according to their scanning mechanism into flatbed type scanners, spatial scanning type scanners and handy type scanners. The flatbed type scanners or the spatial scanning type scanners have problems of portability because of their certainly large scanning mechanism, and their scanning sizes are also limited. The handy type scanners are portable, but unable to acquire wide images because their scanning widths are to be limited within their sizes. Further, there are problems of usability in any type of the image scanners, requiring certainly complicated manipulation, even though they are suitable for inputting document images in view of their excellent resolution.

For resolving these problems of the conventional image input devices, there have been proposed several devices for obtaining a large size image by synthesizing divisional images which are taken from different parts of an object with necessary resolution, making use of an electric still camera (hereinafter simply called a camera) having inexpensive area sensor. In examples of such devices disclosed in "A Hand-Scan Image Digitizer with an Ability for Realtime Assembling of Mosaic Picture" by Okada et al, Technical Journal IE81-17, IEICE (the Institute of Electronics, Information and Communication Engineers), 1981, or in a Japanese patent application entitled "Image Input Device" by Mizoguchi and laid open as a Provisional Publication No. 259557/'94, the divisional images are taken from a fixed object by shifting a position of a camera. By taking the divisional images through shifting the camera position, the user can select only necessary parts of the object to be inputted, which enables to reduce trimming operation after the image acquisition, not only resolves the problem of tradeoff of the resolution and the image size.

However, in the above prior examples, the image synthesis of the divisional images taken by the camera is performed referring only to information included in the divisional images themselves. Therefore, a large amount of calculation and a high processing cost are required, and further, a problem of incorrect synthesis may occur when the object has a monotonous texture having repeated patterns, for example. Still further, when the camera position is displaced manually, there may arise different distortions in different divisional images, such as skews, magnifications or reductions due to distance variation between the camera and the object, making correct image synthesis still more difficult.

Prior arts for dealing with these problems are proposed in a Japanese patent application entitled "Image Input System" and laid open as a Provisional Publication No. 65483/'96, and a Japanese patent application entitled "Image Input Device" and laid open as a Provisional Publication No. 218941/'97.

In the prior art disclosed in the Provisional Publication No. 65483/'96, the image input system comprises an image sensor, a position detector for detecting a position of the image sensor and a synthesizer for synthesizing divisional images taken by the image sensor. For dealing with the above problems, relative displacement of the image sensor is detected each time when a divisional image is taken, and the image synthesis is performed referring to information of the relative displacement thus detected, together with information included in the divisional images.

In the prior art disclosed in the Provisional Publication No. 218941/'97, the image input device has a position detector for detecting a position of a camera from where each of divisional images of an object is taken, a frame for unitizing the position detector and the camera and enabling displacement of the camera parallel to the object, and a means for nominating limited candidates of a position in a synthesized image where each of the divisional images is to be positioned. The above problems are resolved by synthesizing each of the divisional images at a correct position which is selected among the respective candidates.

In the prior arts disclosed in the Provisional Publications No. 65483/'96 and No. 218941/'97, the image input devices are so configured that the user may take the divisional images by manually displacing the camera unit in his desired direction, and in the prior art disclosed in the Provisional Publication No. 218941/'97, errors included in positional information of the divisional images are designed to be removed through image processing. However, user's freedom in displacement of the camera unit also means that the user should displace the camera unit in various directions for obtaining necessary numbers of divisional images, which may force unnatural movement of the user's arm, resulting in increase of the positional errors as well as decrease of usability.

As above described, nature or characteristic of the image input operation performed by the user composes a variation factor of the divisional images. However, the characteristic of the image input operation has not been considered, for improving positioning precision of the divisional images, in any of the prior arts for synthesizing a whole image from divisional images taken from an object with necessary resolution by displacing the camera unit.

SUMMARY OF THE INVENTION

Therefore, a primary object of the present invention is to provide an image input system which enables to obtain a high-precision composite image at high speed with an easy operation from divisional images taken from an object, through calculating positional relations among the divisional images at high speed and with high precision by making use of the characteristic of the image input operation.

Another object of the invention is to provide an image input system wherein a user can perform image input operation without especially considering overlaps between the divisional images.

In order to achieve the objects, an image input system according to the invention comprises:

a camera;

a position detector for detecting a present position of the camera;

a supporting means for supporting the camera to be movable on an object maintaining a fixed distance to the object, and unitizing the position detector and the camera;

an image acquisition indicating means for generating an image acquisition indication referring to the present position of the camera detected by the position detector, each of a plurality of divisional images being acquired according to the image acquisition indication automatically at fixed intervals so as to have an overlap with another of the divisional images;

an acquisition condition collecting means for collecting acquisition condition information of each of the divisional images according to the image acquisition indication generated by the image acquisition indicating means;

a candidate nominating means for nominating a candidate parameter set according to the acquisition condition information collected by the acquisition condition collecting means;

an image acquiring means for acquiring each of the divisional images according to the image acquisition indication generated by the image acquisition indicating means, and storing the divisional images together with attribution information of the divisional images and the acquisition condition information collected by the acquisition condition collecting means;

a positioning parameter determining means for determining a positioning parameter for each of the divisional images, by finding a most appropriate correction parameter among correction parameters included in the candidate parameter set, through applying matching operation to the divisional images according to the attribution information and the candidate parameter set of each of the divisional images; and an image synthesizing means for synthesizing a composite image of the object by assembling each of the divisional images according to the positioning parameter determined for respective each of the divisional images by the positioning parameter determining means.

The acquisition condition information includes information indicating whether respective one of the divisional images is a first or not of a sequence of the divisional images which are acquired automatically at fixed intervals with one movement of the camera; and the candidate nominating means nominates the candidate parameter set differently according to whether respective one of the divisional images is a first or not of a sequence of the divisional images which are acquired automatically at fixed intervals with one movement of the camera, referring the acquisition condition information.

Therefore, the composite image can be synthesized at high speed and with high-precision, since the matching operation is performed making use of the candidate parameter set which is nominated according to the acquisition condition information collected by the acquisition condition collecting means.

Further, the user can perform image input operation without especially considering overlaps between the divisional images, since the image acquisition indicating means generates the image acquisition indication automatically at fixed intervals referring to the present position of the camera detected by the position detector, so that each of the divisional images has overlap with another of the divisional images.

In the image input system of the invention, the divisional images are acquired being divided into more than one sequences, the divisional images of each of the sequences being acquired at fixed intervals with one movement in a direction of the camera which is unitized with the position detector by the supporting means.

Therefore, the user can perform the image input operation more naturally than conventional image input devices, by repeating a sliding movement of the camera in a certain direction from a distant point to a near point according to arm's natural movement.

The image input system may further comprise an intermediate image generating means for generating intermediate images, each of the intermediate images being synthesized from a sequence of the divisional images which are acquired automatically at fixed intervals with one movement of the camera, and the positioning parameter determining means may determine the positioning parameter for each of the divisional images, through further applying matching operation to the intermediate images generated by the intermediate image generating means.

As to the position detector, a mouse-type pointing device may be applied.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be describe in connection with the drawings.

Figure 1:
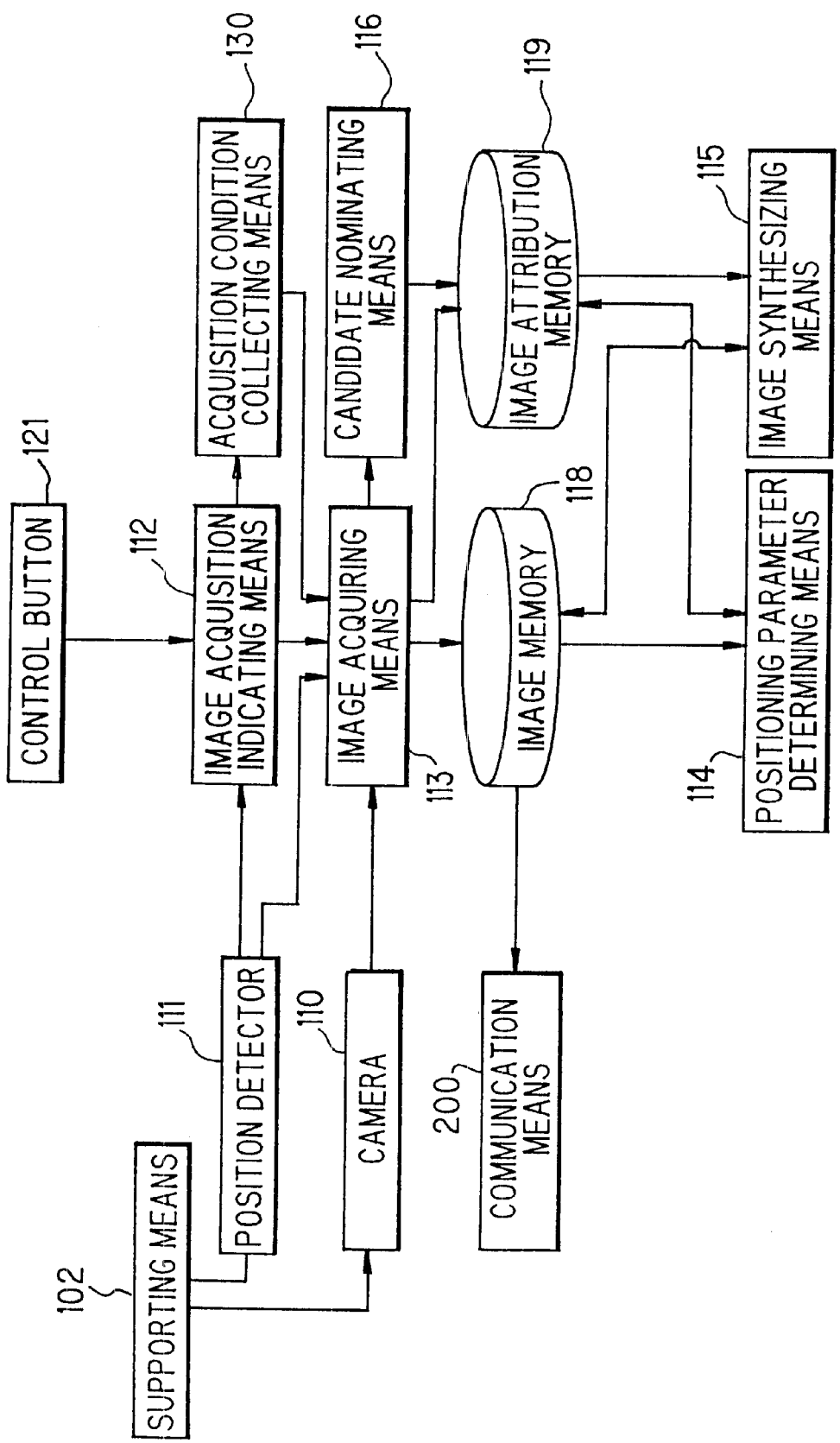
FIG. 1 is a block diagram illustrating a configuration of an image input system according to a first embodiment of the invention.

FIG. 1 is a block diagram illustrating a configuration of an image input system according to a first embodiment of the invention.

The image input system of FIG. 1 comprises;

a camera 110 for acquiring divisional images of an object, a position detector 111 for detecting a present position of the camera, a supporting means 102 for unitizing the camera 110 and the position detector 111, and enabling to slide the camera 110 maintaining a fixed distance to the object, a control button 121 provided for a user to control image input operation, an image acquisition indicating means 112 for deciding an acquisition timing of each of the divisional images in accordance with the present position of the camera 110 detected by the position detector 111 and a status of the control button 121, and outputting, at each acquisition timing, an image acquisition indication together with the present position of the camera 110 detected by the position detector 111, an acquisition condition collecting means 130 for collecting acquisition condition information of each of the divisional images in accordance with the image acquisition indication and the present position of the camera 110 outputted from the image acquisition indicating means 112, operational conditions at the acquisition timing of the divisional image being known with the acquisition condition information, an image memory 118, an image attribution memory 119, an image acquiring means 113 for storing a divisional image acquired by the camera 110 into the image memory 118 in accordance with the image acquisition indication outputted from the image acquisition indicating means 112, outputting attribution information, such as an acquisition position or an acquisition order of the divisional image, and storing the attribution information into the image attribution memory 119, a candidate nominating means 116 for nominating a possible set of correction parameters (hereinafter called the candidate parameter set) to be used for canceling errors included in the acquisition position of the divisional image in accordance with the attribution information outputted from the image acquiring means 113, and storing the candidate parameter set into the image attribution memory 119, a positioning parameter determining means 114 for determining a positioning parameter which cancels errors included in the acquisition position of the divisional image, through applying a matching operation among the divisional images stored in the image memory 118 referring to the attribution information and the candidate parameter set stored in the image attribution memory 119, and storing the positioning parameter into the image attribution memory 119, an image synthesizing means 115 for synthesizing a composite image by assembling the divisional images stored in the image memory 118 in accordance with the attribution information and the positioning parameters stored in the image attribution memory 119, and storing the composite image into the image memory 118, and a communication means 200 for outputting the composite image to external equipment (not depicted in the drawings).

The above components work as follows.

The supporting means 102 unitizes the camera 110 and the position detector 111 into a camera unit and enables to displace the camera 110 maintaining a fixed distance to the object, so that the position detector 111 may always detect the present position of the camera 110.

The user performs image input operation by smoothly sliding the camera unit manually on an object, in such a manner as to input images of the object, strip by strip, by diving the object into rectangular strips. Along with this displacement, the present position of the camera 110 is detected by the position detector 111 continuously.

The image acquisition indicating means 112 obtains displacement of the camera 110 from the present position detected by the position detector 111, and the user's indication from the status of the control button 121, and checks whether an acquisition timing of a divisional image arrives or not referring thereto. When an acquisition timing arrives, the image acquisition indicating means 112 transmits an image acquisition indication to the image acquiring means 113 and the acquisition condition collecting means 130 together with positional information of the divisional image to be acquired, that is, the present position of the camera 110 detected by the position detector 111.

Receiving the image acquisition indication, the acquisition condition collecting means 130 collects information of image acquisition conditions at the acquisition timing, and transmits the information to the image acquiring means 113.

The image acquiring means 113 stores a divisional image taken by the camera 110 into the image memory 118 in accordance with the image acquisition indication outputted from the image acquisition indicating means 112, and, at the same time, stores the attribution information, such as the acquisition position or the acquisition order of the divisional image, into the image attribution memory 119. The image acquiring means 113 also transmits the acquisition condition information collected by the acquisition condition collecting means 130 to the candidate nominating means 116 together with the image acquisition indication.

The candidate nominating means 116 nominates the candidate parameter set to be used for canceling errors included in the acquisition position of the divisional image in accordance with the attribution information outputted from the image acquiring means 113 and the acquisition condition information collected by the acquisition condition collecting means 130. The candidate parameter set is stored in the image attribution memory 119.

The positioning parameter determining means 114 determines the positioning parameter referring to the attribution information and the candidate parameter set stored in the image attribution memory 119.

Making use of the positioning parameter determined by the positioning parameter determining means 114, the image synthesizing means 115 synthesizes a composite image by assembling the divisional images stored in the image memory 118, and stores the composite image into the image memory 118.

Now, detailed operation of the image input system of FIG. 1 will be described in connection with an example configured according to the first embodiment.

Figure 2:
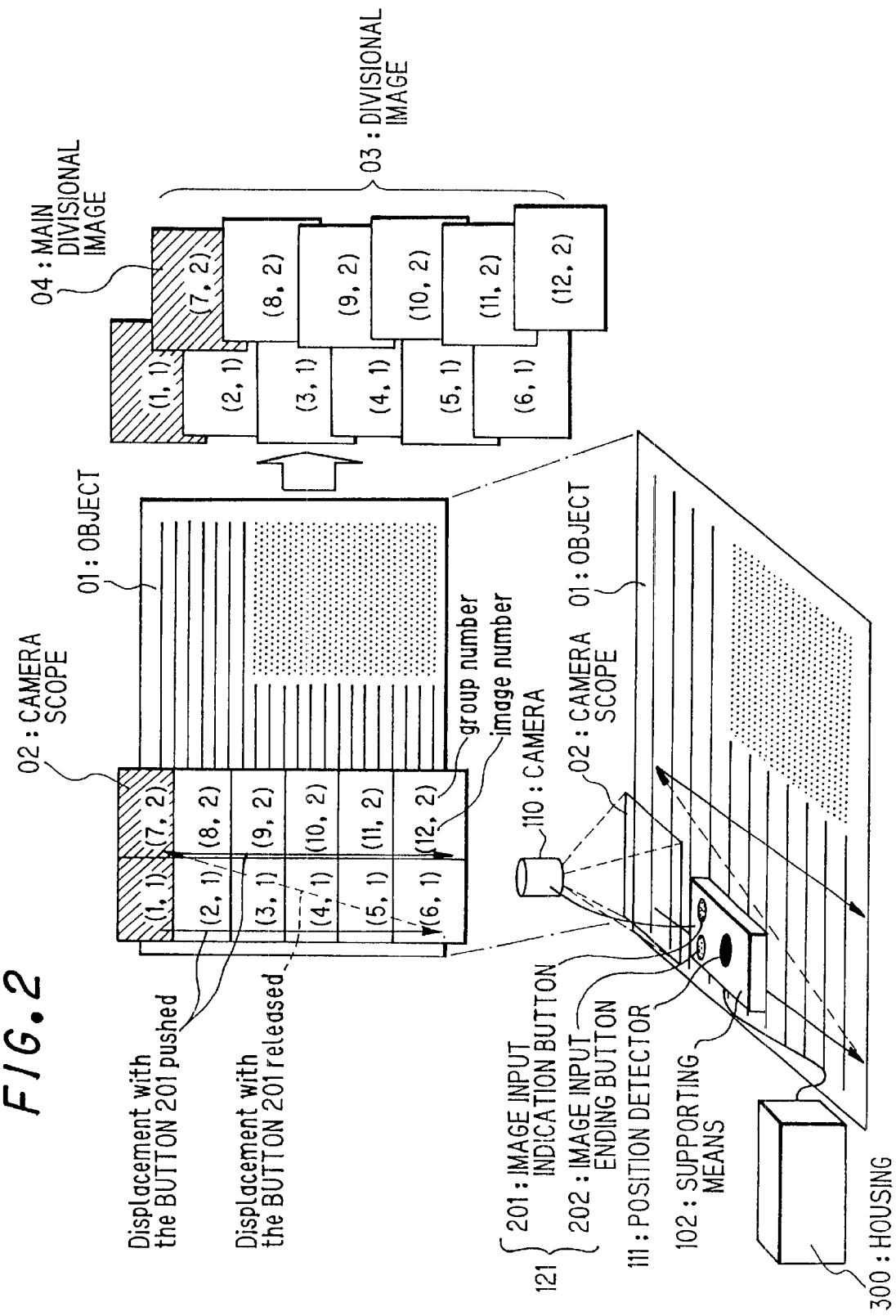
FIG. 2 is a schematic diagram illustrating the image input operation of the first embodiment.

FIG. 2 is a schematic diagram illustrating the image input operation of the first embodiment, wherein the divisional images 03 of the object 01 are taken successively by the camera 110 which is smoothly slid on the object 01 maintaining a fixed distance between the camera 110 and the object 01.

The camera 110 is set to the supporting means 102 so as to maintain the fixed distance upward from the object 01 with its optical axis directed vertically towards the object 01, being unitized with the position detector 111. In the example of FIG. 2, the control button 121 are also unitized with the camera 110. In the following paragraphs, the assembly of the camera 110, the position detector 111, the control button 121 and the supporting means 102 is called the camera unit. The camera unit can be realized, for example, by unitizing a small CCD camera and a mouse type pointing device, which are commonly used as peripherals of the computer, in such a way as proposed in the prior art disclosed as the Provisional Publication No. 218941/'97. The other components are accommodated in a housing 300 and the camera unit is connected to the housing 300 with a cable, in the example of FIG. 2.

By sliding the camera unit on the object 01, a camera scope 02 of the camera 110 is shifted and the divisional images 03 are taken. Here, the camera 110 is supported by the supporting means 102 so as to slide stably on the object 01 maintaining the fixed distance between the camera 110 and the object 01. Therefore, no distortion, such as skew, magnification or reduction due to variation of the distance between the camera 110 and the object 01, is included in the divisional images 03. In the divisional images 03, only the variation caused by rotation and parallel displacement is included, which can be represented by a transformation formula called a rigid-body transformation.

In the following paragraphs, each of the divisional images 03 is described to have Sx×Sy monochrome pixels of 256 tones, by way of example. However, the divisional images 03 may be binary images or color images.

Figure 3:
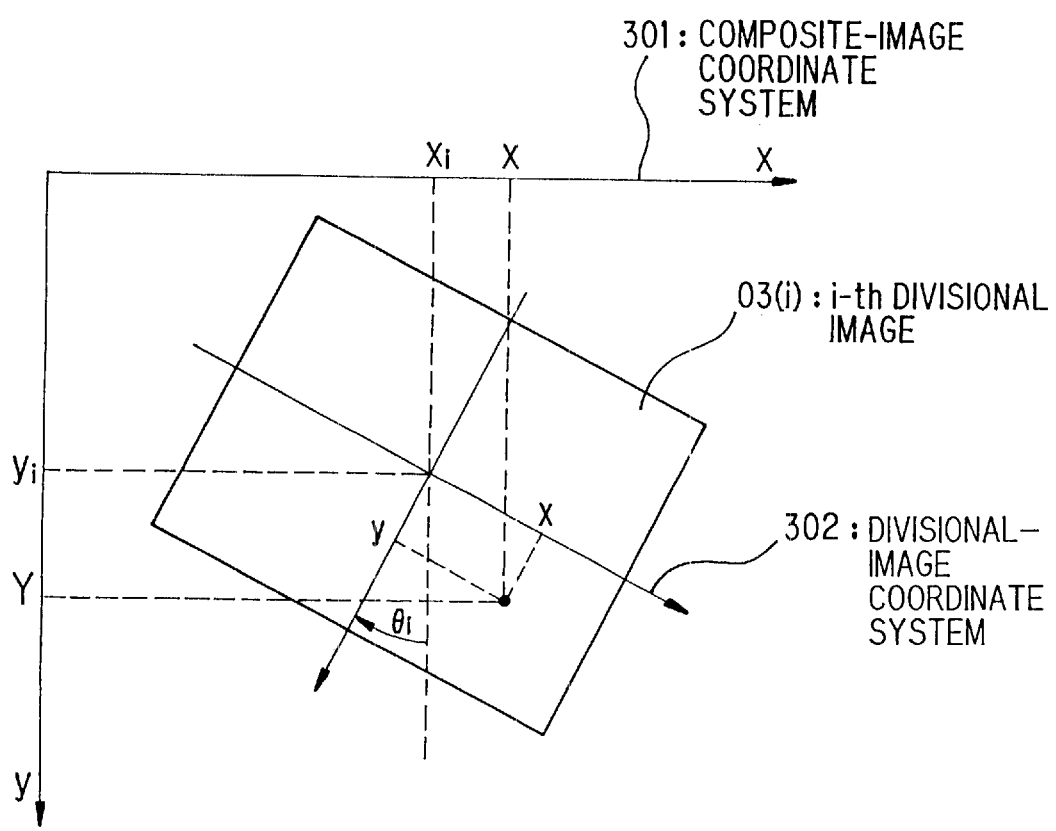
FIG. 3 is a schematic diagram illustrating coordinate systems to be applied in the document.

FIG. 3 is a schematic diagram illustrating coordinate systems to be applied in the following descriptions.

In FIG. 3, a position of an i-th divisional image 03(i) in the composite image to be synthesized can be represented by a parameter set $(x_i, y_i, \theta_i)$, where, $x_i$ and $y_i$ are coordinates of an origin of a divisional-image coordinate system 302 defining the i-th divisional image 03(i) on a composite-image coordinate system 301 for defining the composite image, and $\theta_i$ is an angle between coordinate axes of the composite-image coordinate system 301 and the divisional-image coordinate system 302.

In this document, the parameter $(x_i, y_i, \theta i)$, which gives a position where the divisional image 03(i) is to be positioned in the composite image to be synthesized, is called the positioning parameter.

Positions of pixels of each divisional image 03(i) are defined on the divisional-image coordinate system 302 having its origin at a center of the respective divisional image 03(i), and a position of the divisional images 03(i) is defined by coordinates of the origin of the respective divisional-image coordinate system 302 and its rotation relative to the composite-image coordinate system 301. The origin and xy-directions of the composite-image coordinate system 301 may be defined according to a position and xy-directions of the camera 110 at a timing, or they may be defined according to a coordinate system specifically defined for the object 01.

Returning to FIG. 2, the position detector 111 detects a camera position by, for example, counting pulses generated by an x-direction rotary encoder and a y-direction rotary encoder according to rotation of a friction ball which is rotated through sliding of the camera unit. As to the position detector 111, a magnetic sensor, a supersonic sensor or an acceleration sensor may be applied other than the rotary encoder.

In the following paragraphs, the position detector 111 is described to output the position of the camera 110 with coordinate values on the composite-image coordinate system 301 of FIG. 3.

The control button 121 has an image input indicating button 201 and an image input ending button 202, whereby the user controls image input operation of the image input system. The user shifts the camera scope 02 by sliding the camera unit in a direction with a stroke pushing the image input indicating button 202, whereby a sequence of the divisional images of a rectangular strip of the object 01 are acquired, and by repeating the above stroke, the divisional images 03 covering a desired part of the object 01 are acquired, strip by strip.

In FIG. 2, a pair of numerals (i,g) marked in each of the divisional images 03 represents an image number i and a group number g. The image number i is assigned sequentially to each of the divisional images 03 in the order of its acquisition. The group number g is a numeral commonly assigned to each sequence of the divisional images 03 acquired with a stroke, in the order of the stroke. Referring to the image number i and the group number g, the acquisition order and the stroke order of a specific divisional image 03 can be identified. Hereinafter, a specific divisional image identified by an image number i and a group number g is expressed as a divisional image 03(i,g).

As beforehand described, the position detector 111 detects the position of the camera 110 according to its relative displacement making use of a rotary encoder. The rotary encoder has a simple configuration and merits in its handiness. However, outputs of the rotary encoder include a certain amount of errors which become large according to displacement amount, and it cannot detect rotation of the camera unit in a plane parallel to the object. Therefore, when the divisional images 03 are synthesized directly according to their acquisition position outputted from the position detector 111, quality of the composite image becomes degraded because of the errors included in the acquisition position. The situation is more or less the same when other devices such as the magnetic sensor, the supersonic sensor or the acceleration sensor is applied to the position detector 111.

In the embodiment, these errors included in the acquisition position of the divisional images 03(i,g) are canceled by the positioning parameter determining means 114. In other words, by canceling the errors of the acquisition position outputted from the position detector 111 by way of image processing, the problem of tradeoff between precision of the composite image and the device cost including the position detector 111 is resolved.

For this purpose, the candidate nominating means 116 nominates a candidate parameter set $C_i$, which indicates maximum possible deviation of the positioning parameter $(x_i, y_i, \theta_i)$ outputted by the position detector 111 from correct values of the positioning parameter $(x_i, y_i, \theta_i)$, and is used by the positioning parameter determining means 114 for determining the correct values of the positioning parameter $(x_i, y_i, \theta_i)$ of each divisional image 03(i,g).

In the prior arts disclosed in the Provisional Publications No. 65483/'96 and No. 218941/'97, the image input devices are so configured that the user may take the divisional images by manually displacing the camera unit in his desired direction, and in the prior art disclosed in the Provisional Publication No. 218941/'97, errors included in acquisition position of the divisional images are designed to be removed through image processing, as beforehand described. However, user's freedom in displacement of the camera unit also means that the user should displace the camera unit in various directions for obtaining necessary numbers of divisional images, which may force unnatural movement of the user's arm, resulting in increase of the positional errors of the output of the position detector 111 as well as decrease of usability.

For dealing with this problem, the camera unit of the embodiment is so designed to be displaced on the object 01 in a fixed direction, stroke by stroke, from a distant point to a near point, for example, as shown in FIG. 2. Thus, sequences or groups of the divisional images 03 are acquired from the object 01, strip by strip, by repeating a natural movement of the user's arm.

In this image input operation, displacement of the camera unit between two successive divisional images becomes larger between divisional images of different groups, between divisional images 03(6, 1) and 03(7, 2) of FIG. 2, for example, than between two divisional images in the same group, the first group of the divisional images 03(1, 1) to 03(6, 1), or the second group of the divisional images 03(7, 2) to 03(12, 2) of FIG. 2, for example.

In consideration of this characteristic of the image input operation, the image acquisition indicating means 112 controls acquisition timings of divisional images 03 so that an overlap may surely exist between two successive divisional images 03 in each stroke for acquiring divisional images 03 of the same group, such as the divisional images 03(2, 1) to 03(6, 1) of the first group or the divisional images 03(8, 2) to 03(12, 2) in the example of FIG. 2, in order to reduce errors in the acquisition position detected by the position detector 111.

At the same time, the candidate parameter set $C_i$ is nominated by the candidate nominating means 116 also in consideration of the characteristic of the image input operation. That is, the candidate parameter set $C_i$ corresponding to larger deviation is nominated for a begining divisional image of each group (hereinafter called a main divisional image), such as the divisional image 03(7, 2) of the second group, and the candidate parameter set $C_i$ corresponding to smaller deviation is nominated for each of other divisional images successively acquired in each stroke, such as the divisional images 03(2, 1) to 03(6, 1) and 03(8, 2) to 03(12, 2).

Thus, both the high quality of the composite image and the reduction of calculation amount for determining the positioning parameter are attained at the same time.

Figure 4:
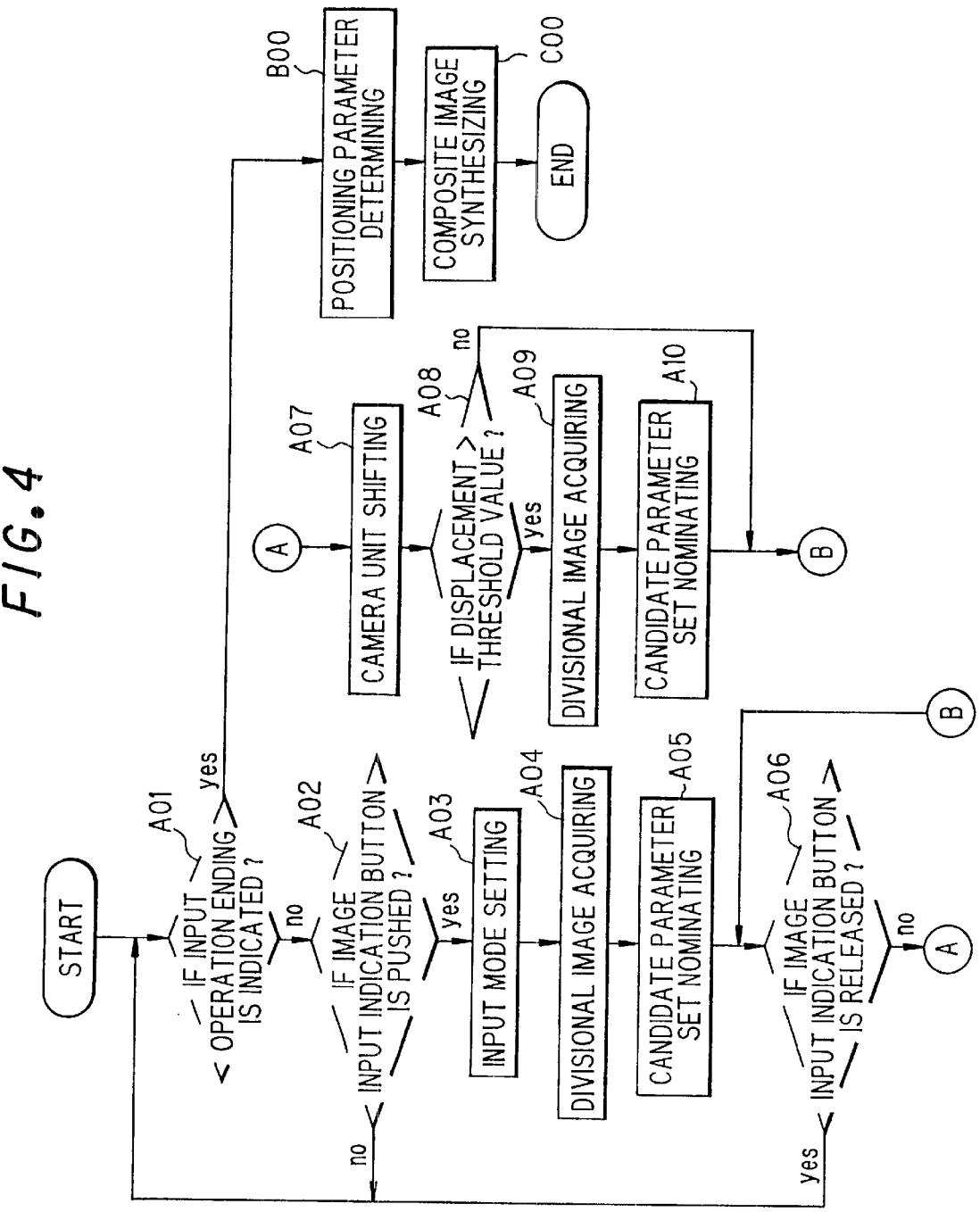
FIG. 4 is a flowchart illustrating operational steps of the image input system according to the first embodiment.

FIG. 4 is a flowchart illustrating operational steps of the image input system according to the first embodiment.

Referring to FIG. 4, there are comprised an input operation ending detection step A01, an image input indicating button checking step A02, an input mode setting step A03, a first divisional image acquiring step A04, a first candidate parameter set nominating step A05, a button release checking step A06, a camera unit shifting step A07, a displacement checking step A08, a second divisional image acquiring step A09, a second candidate parameter set nominating step A10, a positioning parameter determining step B00 and a composite image synthesizing step C00.

Figure 5:
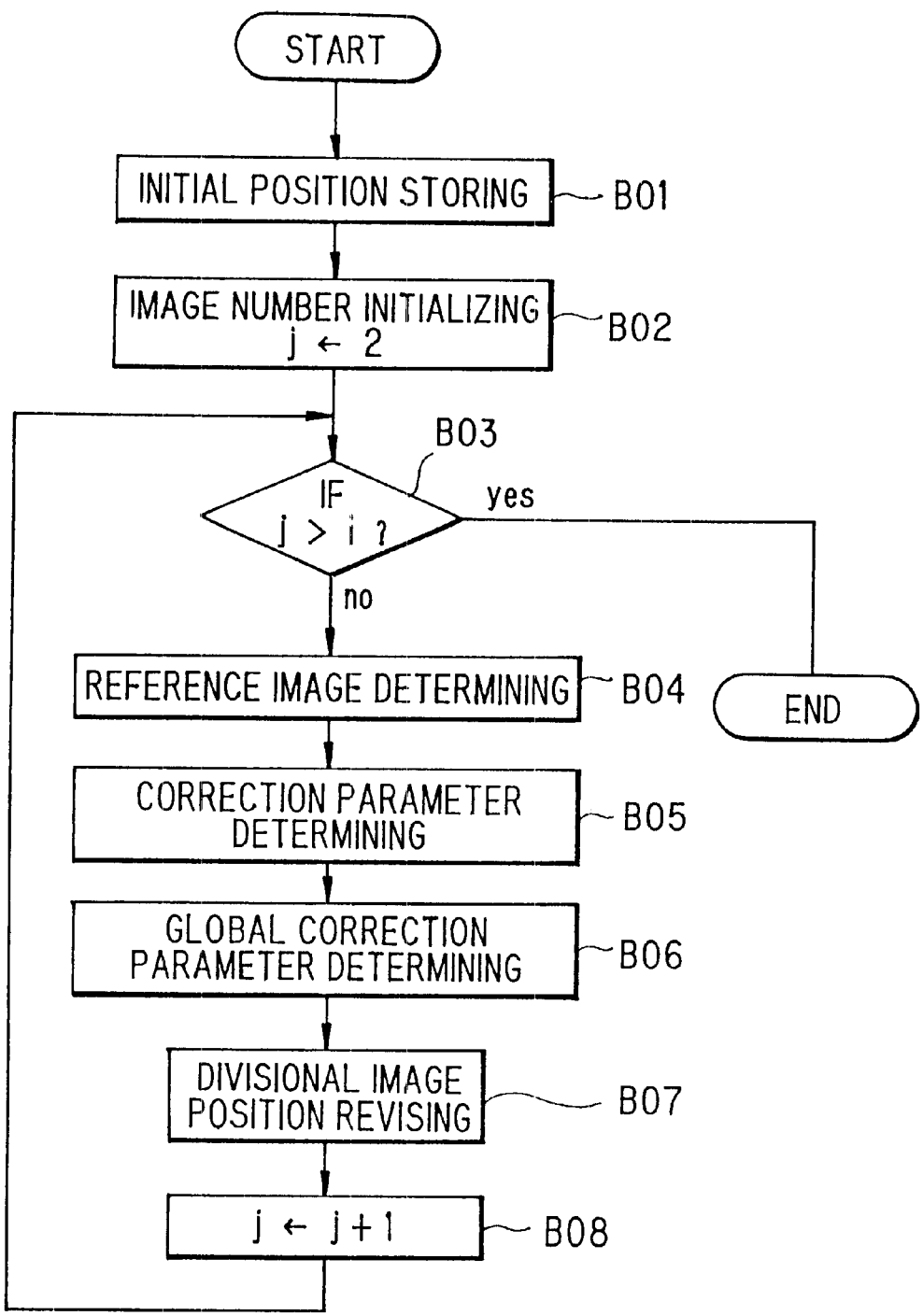
FIG. 5 is a flowchart illustrating detailed steps of the positioning parameter determining step B00 of FIG. 4.

FIG. 5 is a flowchart illustrating detailed steps of the positioning parameter determining step B00 of FIG. 4 performed by the positioning parameter determining means 114.

Referring to FIG. 5, the positioning parameter determining step B00 comprises a present position storing step B01, a divisional image number initializing step B02, a process ending detecting step B03, a reference image determining step B04, a correction parameter determining step B05, a global correction parameter determining step B06, divisional image position revising step B07 and a divisional image number revising step B08.

Now, referring to FIGS. 4 and 5, detailed operation of the first embodiment is described.

In an initial status, the control button 121 (the image input indicating button 201 and the image input ending button 202) is released and both the image number i and the group number g are initialized as follows;

i←0, g←0.

Until an image input operation ending is indicated from a user by pushing the image input ending button 202 ("yes" of the step A01), divisional images 03 of the object 01 are acquired through repeating steps A02 to A10.

Checking status of the image input indicating button 201 (at step A02), the image acquisition indicating means 112 returns the control to step A01 when the image input indicating button 201 is not pushed ("no" of the step A02). When the user pushes the image input indicating button 201 ("yes" of the step A02), the image acquisition indicating means 112 delivers an image acquisition indication to acquire a first divisional image 03(1, 1) to the image acquiring means 113.

Here, the image acquisition indicating means 112 obtains a present position $(X_{now}, Y_{now})$ of the camera unit from the position detector 111 and delivers the image acquisition indication to the image acquiring means 113 and sets the present position to a last position $(X_{last}, Y_{last})$ as follows;

$X_{last} = X_{now}$, $Y_{last} = Y_{now}$.

At the same time, the image acquisition indicating means 112 delivers the image acquisition indication also to the acquisition condition collecting means 130 together with the last position $(X_{last}, Y_{last})$ as the acquisition position of the first divisional image 03(1, 1).

Notified of beginning of the image input operation, the condition collecting means 130 increments the group number g as follows (step A03), g←g+1.

The last position $(X_{last}, Y_{last})$ is to be used for acquiring following divisional images automatically.

Receiving the image acquisition indication from the image acquisition indicating means 112, the image acquiring means 113 acquires the first divisional image 03(1, 1), or generally speaking, a divisional image 03(i,g) from the camera 110 and stores it in the image memory 118 (at step A04), incrementing the image number i as follows, i←i+1.

The image acquiring means 113 also sets the attribution information $\{g_i, x_i, y_i, \theta_i\}$ of the divisional image 03(i,g) as follows;

$g_i = g$, $x_i = X_{now}$, $y_i = Y_{now}$, and $\theta_i = 0$, according to the present position $(X_{now}, Y_{now})$ of the camera unit received from the position detector 111 and the group number g incremented by the acquisition condition collecting means 130. The attribution information is stored by the image acquiring means 113 in the image attribution memory 119 associated with the image number i. The attribution information $\{g_i, x_i, y_i, \theta_i\}$ is also transmitted to the candidate nominating means 116 as the group number $g_i$ and the acquisition position $(x_i, y_i, \theta_i)$ of the divisional image 03$(i, g_i)$.

Here, it is to be noted that the rotation value $\theta_i$ of the acquisition position is set temporarily to be 0, when the position detector 111 cannot detect the rotation of the camera unit.

The candidate nominating means 116 nominates the candidate parameter set $C_i$ (at step A05) so as to cover maximum possible deviation of the positioning parameter $(x_i, y_i, \theta_i)$ for the concerning divisional image 03$(i, g_i)$, referring to the group number $g_i$ and the positioning parameter $(x_i, y_i, \theta_i)$ of the divisional image 03$(i, g_i)$.

For the first, the candidate nominating means 116 checks whether the concerning divisional image 03$(i, g_i)$ is a main divisional image 04 or not, by comparing the group number $g_i$ of the concerning divisional image 03$(i, g_i)$ to the group number $g_{-1}$ of the preceding divisional image 03$(i-1, g_{i-1})$. When $g_i \approx g_{i-1}$, the concerning divisional image 03$(i, g_i)$ is regarded as one of main divisional images 04, and otherwise, it is regarded as one of ordinary divisional images 03.

When the concerning divisional image 03$(i, g_i)$ is one of the main divisional images 04, a larger candidate parameter set $C_i$ is nominated than candidate parameter sets to be nominated to ordinary divisional images 03, so that the positioning parameter determining means 114 can apply more precise error canceling operation than the error canceling operation to be applied to the ordinary divisional images 03.

The candidate parameter set $C_i$ is a set of possible correction parameters to be applied for transforming the positioning parameter from initial values to correct values, and may be nominated according to characteristic and precision of the position detector 111.

When the size Sx×Sy of the divisional images 03 is 160×120, and errors of the rotary encoder applied to the position detector 111 is about ±10%, for example, the candidate parameter set $C_i$ may be nominated as follows for the main divisional images 04;

$C_i = \{(dx, dy, \theta) | -40 \leq dx \leq 40, -40 \leq dy \leq 40, -10 \leq \theta \geq 10\}$, and $C_i = \{(dx, dy, \theta) | -10 \leq dx \leq 10, -20 \leq dy \leq 20, -3 \leq \theta \geq 3\}$ for the ordinary divisional images 03.

Here, (dx, dy) and $\theta$ represent parallel components and a rotation component of the correction values of the positioning parameter $(x_i, y_i, \theta_i)$, respectively.

The candidate parameter set $C_i$ is stored in the image attribution memory 119.

Above equations are mere examples of the candidate parameter set $C_i$. They may be represented directly with parameters of a rigid-body transformation instead of the parallel components and the rotation component, or they may be nominated in more detail in consideration of other acquisition condition such as length of time interval between successive two divisional images, besides the difference of the main divisional images 04 and the ordinary divisional images 03.

Then, returning to FIG. 4, the image acquisition indicating means 112 checks the status of the image input indicating button 201 (at step A06), and transfers the control to step A07 when the image input indicating button 201 is still pushed, for acquiring following ordinary divisional images 03.

The user displaces the camera unit in the fixed direction on the object 01 pushing the image input indication button 201 (at step A07), whereby the present position $(X_{now}, Y_{now})$ changes.

Comparing (at step A08) the present position $(X_{now}, Y_{now})$ of the camera 111 detected by the position detector 110 to the last position $(X_{last}, Y_{last})$ representing the acquisition position of the preceding divisional image 03$(i-1, g)$, the image acquisition indicating means 112 transmits call image acquisition indication to the image acquiring means 113 to acquire a new divisional image 03$(i, g)$, when displacement of the camera unit exceeds ("yes" at step A08) a threshold value (Tx, Ty). When the displacement is within the threshold value (Tx, Ty), the control returns to step A06.

More concretely, the image acquisition indication is delivered when either one of following two conditions stands;

$|X_{now} - X_{last}| > Tx$, $|Y_{now} - Y_{last}| > Ty$.

Receiving the image acquisition indication, the image acquiring means 113 acquires (at step A09) a new divisional image 03$(i, g)$ in the same way as described in connection with step A04, and the candidate nominating means 116 nominates the candidate parameter set $C_i$ (at step A10) for the newly acquired divisional image 03$(i, g)$ as above described in connection with step A05.

The threshold value (Tx, Ty) is determined so that an overlap may exist between the newly acquired divisional image 03$(i, g)$ and the preceding divisional image 03$(i-1, g)$, as follows, for example, from the size (Sx, Sy) of the divisional images 03;

$Tx = Sx/2$, and $Ty = Sy/2$, wherein about a half of the newly acquired divisional image 03$(i, g)$ overlaps on the preceding divisional image 03$(i-1, g)$.

The comparison conditions $|X_{now} - X_{last}| > Tx$, or $|Y_{now} - Y_{last}| > Ty$ referred to at step A08 may be determined differently. In the above conditions, displacement in the x-direction and in the y-direction are compared independently with simple linear operation. Therefore, when the camera unit is displaced in (an oblique direction to the composite-image coordinate system 301, the overlap between two successive divisional images may become small. In the embodiment, the camera unit is slid from a distant point to a near point with a natural movement of the user's arm. Therefore, such possibility is little. However, by calculating displacement length M of the camera unit according to an equation;

$M = \sqrt{(X_{now} - X_{last})^2 + (Y_{now} - Y_{last})^2}$, the condition may be defined as;

$M > \min(Tx, Ty)$, min(Tx, Ty) denoting a minimum value of Tx and Ty.

After nominating the candidate parameter set $C_i$ at step A10, the control is returned to step A06 for checking the status of the image input indication button 201.

When the image input indication button 201 is found to be released at step A06, automatic acquisition of the ordinary divisional images 03 is suspended and the control is returned to step A01.

When the image input ending button 202 is not found to be pushed at step A01, the image acquisition indicating means 112 monitors the status of the image input indication button 201 (at step A02), and acquisition of next group of the divisional images, a main divisional image 04 and following ordinary divisional images 03 is performed by repeating operational steps A03 to A10.

When the image input ending button 202 is found to be pushed at step A01, the image acquisition indicating means 112 stops to generate the image acquisition indication and the control goes to step B00, wherein determination of the positioning parameters is performed by the positioning parameter determining means 114 so as to cancel the errors included in the acquisition position of each of the divisional images 03.

Referring to FIG. 5, the positioning parameter determining means 114 first reads out the last position $(X_{last}, Y_{last})$, or the acquisition position of every of the divisional images 03(j,g) (j being an integer from 1 to i which is the image number lastly incremented at step A09) from the image attribution memory 119 and stores them in the candidate nominating means 116 (at step B01) as the initial values $I_j$ of the positioning parameters. In the following paragraphs, initial value $I_j$ of the positioning parameter $(x_j, y_j, \theta_j)$ of the divisional image 03(j,g) is expressed as $I_j = (Ix_j, Iy_j, Ir_j)$.

Then, the positioning parameter determining means 114 initializes (at step B02) a variable j representing an image number of a concerning divisional image as;

j←2.

Then, at step B03, the positioning parameter determining means 114 compares the variable j to the maximum image number i for checking whether all the divisional images 03 are processed or not, and applies steps B03 to B08 for each of the divisional images 03(j,g), until the condition j>i stands.

Figure 6:
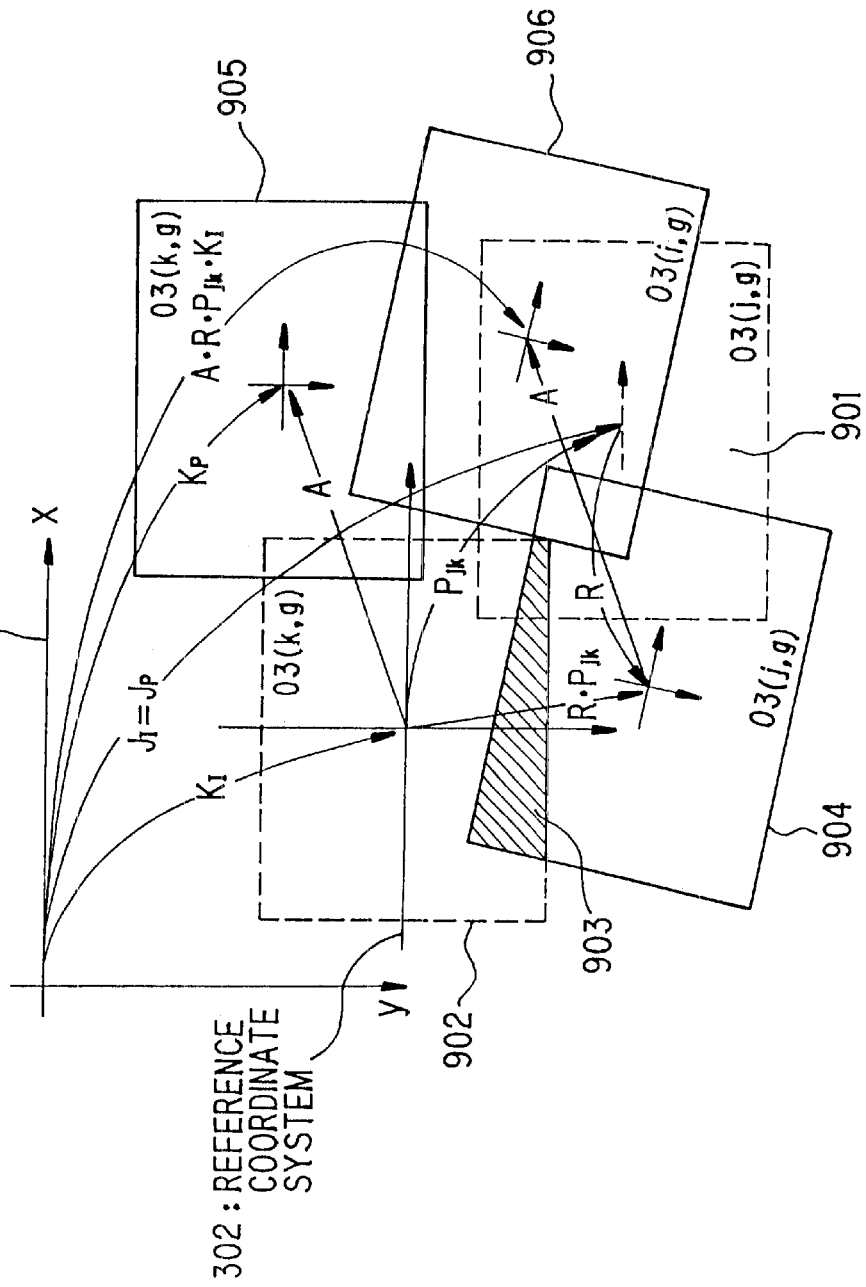
FIG. 6 is a graphic chart schematically illustrating processes for determining the positioning parameter of the divisional image O3(j,g)

FIG. 6 is a graphic chart schematically illustrating processes for determining the positioning parameter of the divisional image 03(j,g).

The acquisition position $P_j$ of the divisional image 03(j,g) is expressed as $P_j = (x_j, y_j, \theta_j)$ on the composite-image coordinate system 301, and the acquisition position $P_j$ is the same with the initial value $I_j$ of the positioning parameter.

By expressing the acquisition position $P_j$ or the initial value of the positioning parameter $I_j$ with a matrix, following equation (1) is obtained;

$$J_I = J_P = \begin{pmatrix} \cos\theta_j & -\sin\theta_j & x_j \\ \sin\theta_j & \cos\theta_j & y_j \\ 0 & 0 & 1 \end{pmatrix} \quad (1)$$

Making use of this matrix $J_P$, coordinates (x,y) on the divisional-image coordinate system 302 of the divisional image 03(j,g) can be transferred into coordinates (X,Y) on the composite-image coordinate system 301 as follows;

$$\begin{pmatrix} X \\ Y \\ 1 \end{pmatrix} = J_P \begin{pmatrix} x \\ y \\ 1 \end{pmatrix} = \begin{pmatrix} \cos\theta_j & -\sin\theta_j & x_j \\ \sin\theta_j & \cos\theta_j & y_j \\ 0 & 0 & 1 \end{pmatrix} \begin{pmatrix} x \\ y \\ 1 \end{pmatrix} \quad (2)$$

Then, returning to FIG. 5, the positioning parameter determining means 114 selects (at step B04) a reference image 03(k,g). In the first embodiment, the reference image 03(k,g) is selected from divisional images 03(1, 1) to 03(j−1,g) which are already processed.

When the concerning divisional image 03(j,g) is not the main divisional image 04, it is one of the ordinary divisional images 03 having an overlap with the preceding divisional image 03(j−1,g), such as the the divisional images 03(2, 1) to 03(6, 1) of the first group or the divisional images 03(8, 2) to 03(12, 2) of the second group of FIG. 2, which are taken automatically so as to have overlaps. Therefore, the preceding divisional image 03(j−1,g) is selected to be the reference image 03(k,g) of the concerning divisional image 03(j,g).

When the concerning divisional image 03(j,g) is a main divisional image 04, there may not be any overlap with the preceding divisional image 03(j−1,g−1). Therefore, the reference image 03(k,g) of the concerning divisional image 03(j,g) is selected to be one of the divisional images 03(1, 1) to 03(j−1,g−1) with which a largest overlap exists. The overlap areas are calculated referring to the acquisition positions of the divisional images 03(1, 1) to 03(j−1,g−1).

In the following description, the image number of the reference image is expressed to be k.

The positioning parameter determining means 114 selects (at step B05) a position correction parameter for correcting errors included in the acquisition position of the divisional image 03(j,g) from the candidate parameter set $C_i$, referring to mutual correspondence between the concerning divisional image 03(j,g) and the reference image 03(k,g).

For the purpose, the positioning parameter determining means 114 transforms acquisition position $P_j(=I_j)$ of the concerning divisional image 03(j,g) (numeral 901 of FIG. 6) on the composite-image coordinate system 301 into coordinates on the divisional-image coordinate system of the reference image 03(k,g) (hereinafter called the reference coordinate system 302). Representing the rigid-body transformation matrix $K_I$ of the initial position $I_k = (Ix_k, Iy_k, Ir_k)$ of the reference image 03(k,g) (numeral 902 of FIG. 6) with following equation (3), the rigid-body transformation matrix $P_{jk}$ of the acquisition position of the divisional image 03(j,g) on the reference coordinate system 302 is given by following equation (4).

$$K_I = \begin{pmatrix} \cos Ir_k & -\sin Ir_k & Ix_k \\ \sin Ir_k & \cos Ir_k & Iy_k \\ 0 & 0 & 1 \end{pmatrix} \quad (3)$$

$$P_{jk} = K_I^{-1} J_P \quad (4)$$

$$= \begin{pmatrix} \cos Ir_k & -\sin Ir_k & Ix_k \\ \sin Ir_k & \cos Ir_k & Iy_k \\ 0 & 0 & 1 \end{pmatrix}^{-1} \begin{pmatrix} \cos\theta_j & -\sin\theta_j & x_j \\ \sin\theta_j & \cos\theta_j & y_j \\ 0 & 0 & 1 \end{pmatrix}$$

For selecting a most appropriate positioning parameter, the positioning parameter determining means 114 calculates cross-correlation between the divisional image 03(j,g) and the reference image 03(k,g) concerning an overlap area (numeral 903 of FIG. 6) between them, by applying each candidate correction parameter included in the candidate parameter set $C_j$ to the position of the divisional image 03(j,g) on the reference coordinate system 302, and determines a correction parameter which gives a highest cross-correlation as the positioning parameter of the divisional image 03(j,g).

More concretely, the positioning parameter determining means 114 calculates a rigid-body transformation matrix R of each candidate correction parameter according to following equation (5), and shifts the position of the divisional image 03(j,g) according to following equation (6) applying the matrix R to the matrix $P_{jk}$ (numeral 904 of FIG. 6). The cross-correlation is calculated concerning the overlap area 903 between the reference image 03(k,g) and the divisional image 03(j,g) thus transformed.

$$R = \begin{pmatrix} \cos\theta & -\sin\theta & dx \\ \sin\theta & \cos\theta & dy \\ 0 & 0 & 1 \end{pmatrix} \quad (5)$$

$$RP_{jk} = \begin{pmatrix} \cos\theta & -\sin\theta & dx \\ \sin\theta & \cos\theta & dy \\ 0 & 0 & 1 \end{pmatrix} P_{jk} \quad (6)$$

These processings called matching operation to obtain a matching position of a target image in reference with a reference image are well used in the image processings.

Conventionally, enormous calculation is needed for the matching operation, and therefore expensive devices such as a high-speed processor have been required for reducing operation time.

In the embodiment, the candidate parameter set $C_j$ is limited into necessary minimum by the candidate nominating means 116 referring to acquisition condition of the divisional image 03(j,g) collected by the acquisition condition collecting means 130, as beforehand described. Therefore, the calculation amount needed for the matching operation can be reduced.

In the above example, the matching operation is described to be performed making use of cross-correlation between two images. However, any appropriate conventional method, such as "sum of absolute difference" method, can be applied here to the matching operation.

As to the conventional methods of the matching operation, detailed examples are described in "A Survey of Image Registration Techniques" by L. G. Brown, ACM Computing Surveys, Vol. 24, No. 4, December 1992; pp. 325 to 376, for example, and detailed descriptions are omitted here. Further, a method disclosed by us in a Japanese patent application entitled "Image Matching Method" and laid open as a Provisional Publication No. 49681/'98 may be applicable here, wherein a high-speed matching is performed, making use of a mask image, between images having complicated forms or rotation.

In any case, that is, when any method is applied to the matching operation, the reduction of the calculation amount needed for the matching operation can be attained effectively in the embodiment, by limiting the candidate parameter set $C_j$ into necessary minimum by the candidate nominating means 116 referring to acquisition condition of the divisional image 03(j,g) collected by the acquisition condition collecting means 130.

Returning to FIG. 5, the most appropriate correction parameter $R=(Rx_j,Ry_j,Rr_j)$ is thus determined at step B04.

Then, the positioning parameter determining means 114 calculate a global correction parameter (at step B06) for determining a corrected position (numeral 906 of FIG. 6) of the divided image 03(j,g) on the composite-image coordinate system 301. The global correction parameter is a parameter indicating positional difference between the corrected position $P_k$ (numeral 905 of FIG. 6) and the initial position $I_k$ (902) of the reference image 03(k,g). The rigid-body transformation matrix A of the global correction parameter is calculated as follows from the rigid-body transformation matrix $K_I$ of the initial position Ik and the rigid-body transformation matrix $K_P$ of the corrected position $P_k$.

$$A = K_I^{-1} K_P \quad (7)$$

$$= \begin{pmatrix} \cos Ir_k & -\sin Ir_k & Ix_k \\ \sin Ir_k & \cos Ir_k & Iy_k \\ 0 & 0 & 1 \end{pmatrix}^{-1} \begin{pmatrix} \cos Pr_k & -\sin Pr_k & Px_k \\ \sin Pr_k & \cos Pr_k & Py_k \\ 0 & 0 & 1 \end{pmatrix}$$

In he matching operation performed at step B05, the initial position $P_j=I_j$ (901) of the divided image 03(j,g) is corrected on the reference coordinate system 302. In the composite image, the position of the reference image 03(k,g) itself is corrected with the global correction parameter. Therefore, the initial position $P_j=I_j$ of the divisional image 03(j,g) should be corrected with the correction parameter $R_j$ and also with the global correction parameter.

Thus, the rigid-body transformation matrix of the corrected position on the composite-image coordinate system 301 is calculated as following equation (8).

$$\begin{pmatrix} a_j & -b_j & c_j \\ b_j & a_j & f_j \\ 0 & 0 & 1 \end{pmatrix} = ARP_{jk}K_I \quad (8)$$

From the above equation (8), the positioning parameter determining means 114 revises (at step B07) the positioning parameter $P_j=(x_j,y_j,\theta_j)$ of the divided image 03(j,g) as follows and stores the revised positioning parameter $P_j$ in the image attribution memory 119;

$$x_j=c_j,$$
$$y_j=f_j, \quad (9)$$
$$\theta_j=\sin^{-1}b_j.$$

Then, the positioning parameter determining means 114 increments the variable j (at step B08) for processing a next divisional image 03(j+1,g), returning to step B03.

As above described, the correct positioning parameter is calculated for every of the divisional images 03(1, 1) to 03(i,g) at step B00 of FIG. 4, for canceling errors included in the acquisition position of each of the divided images 03(1, 1) to 03(i,g) detected by the position detector 111.

The image synthesizing means 115 synthesizes (at step C00) the divided images 03(1, 1) to 03(i,g) into the composite image, making use of the respective positioning parameters thus obtained.

More concretely, the image synthesizing means 115 calculates coordinates (X,Y) on the composite-image coordinate system of each pixel (x,y) of each divisional image 03(j,g) stored in the image memory 118, by incrementing the variable j from 1 to i, according to above equation (2) making use of the rigid-body transformation matrix $J_P$ of respective positioning parameter $P_j$ stored in the image attribution memory 119, and projects each pixel value of each divisional image 03(j,g) at respective coordinates (X,Y) thus calculated.

After pixel values of every divisional image 03(1, 1) to 03(i,g) are projected, the obtained composite image is stored in the image memory 118.

As to methods of synthesizing a composite image from divisional images whereof positional information is corrected, detailed examples are described in "Image Analysis Handbook", Tokyo University Press, 1991. 1., pp. 462 to 467, or in "Computer Image Processings: Application and Practice II", Solken-Suppan, 1991, pp. 157 to 182, and detailed descriptions are omitted here.

The composite image thus synthesized and stored in the image memory 118 by the image synthesizing means 115 is transmitted to external equipment by way of the communication means 200.

As heretofore described, sequences of divisional images 03 of an object 01 are inputted strip by strip in the embodiment, by repeating a sliding movement of the camera unit in a certain direction from a distant point to a near point, as shown in FIG. 2. Therefore, the user can perform the image input operation with his arm's natural movement, and making use of characteristics of this natural movement, the composite image is synthesized at high speed and with high precision.

In the above example, the reference image 03(k,g) is selected among divisional images already processed, at step B04, However, a partially synthesized composite image may be used as the reference image, by synthesizing the composite image successively from divisional images processed one by one.

Furthermore, the matching operation may be performed in two steps, through generating intermediate images.

Figure 7:
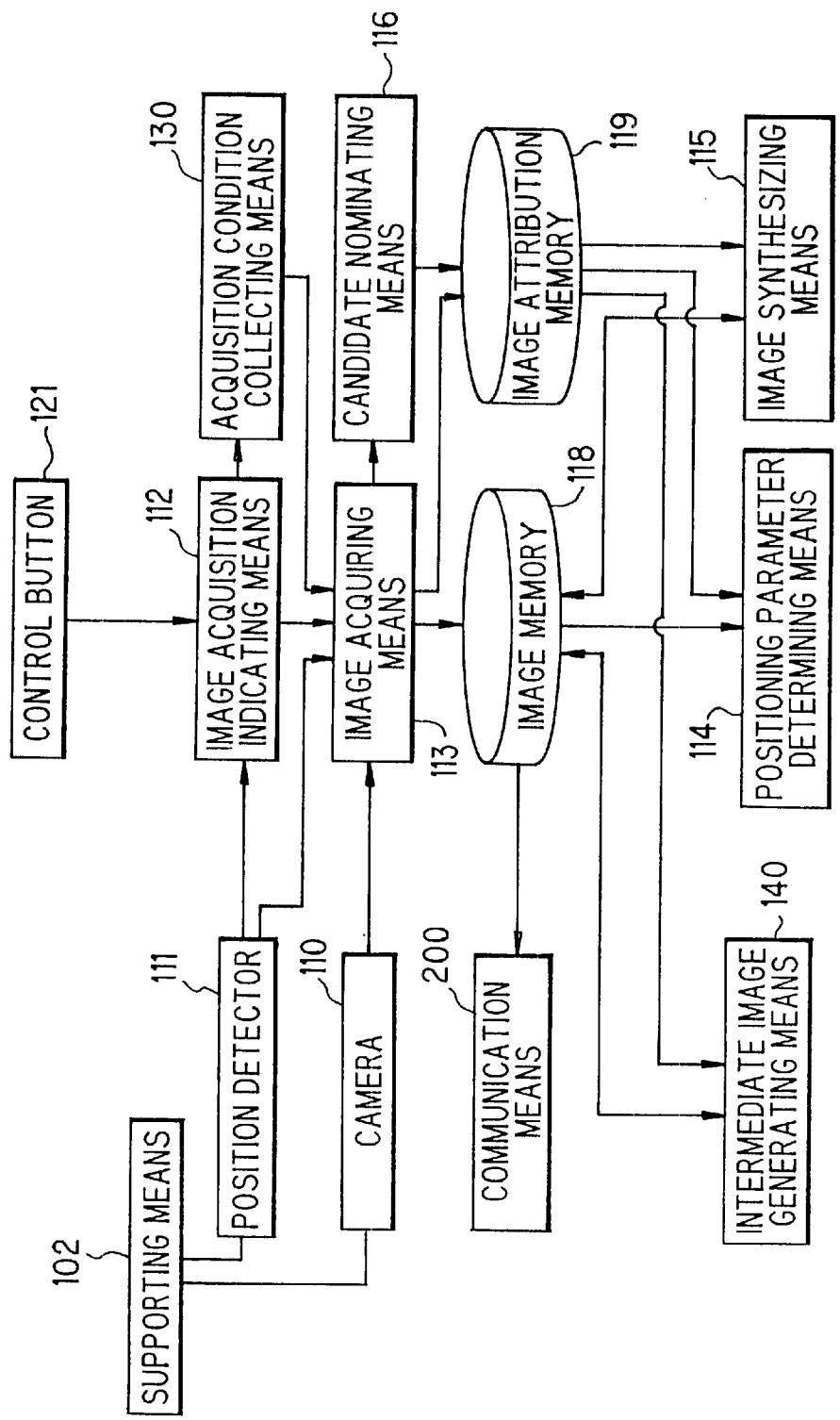
FIG. 7 is a block diagram illustrating a configuration of the image input system according to a second embodiment of the invention.

FIG. 7 is a block diagram illustrating a configuration of the image input system according to a second embodiment.

The difference of the second embodiment from the first embodiment of FIG. 1 lies in that the positioning parameter to be used for canceling errors included in the acquisition position of the divisional image is determined through two steps, that is, a step of synthesizing intermediate images each representing a sequence of divisional images 03 between two successive main division,al images 04 making use of the positioning parameter determined for each of the divisional images 03 by applying the matching operation among the sequence of divisional images 03, and a step of revising the positioning parameter for each of the divisional images applying the matching operation among the intermediate images.

For this purpose, the image input system of FIG. 7 further comprises an intermediate image generating means 140, in addition to the configuration of FIG. 1. The intermediate image generating means 140 takes charge of generating an intermediate image by synthesizing a sequence of divisional images 03, which are acquired at fixed intervals with one slide of the camera unit and processed with the matching operation for canceling errors included therein referring to the divisional images stored in the image memory 118 and the attribution information stored in the image attribution memory 119, and storing the intermediate image into the image memory 118 and the attribution information of the intermediate image into the image attribution memory 119.

Other components of the image input system of FIG. 7 operates in the same way with corresponding components of the image input system of FIG. 1, except that;

the positioning parameter determining means 114 finally determines the positioning parameter for each of the divisional images by applying the matching operation among the intermediate images referring to the intermediate images stored in the image memory 118, and the attribution information and the candidate parameter set $C_i$ stored in the image attribution memory 119, the image memory 118 stores the divisional images acquired by the image acquiring means 113, the intermediate images generated by the intermediate image generating means 140 and the composite image synthesized by the image synthesizing means 115, and the image attribution memory 119 stores the attribution information of the divisional images acquired by the image acquiring means 113, the attribution information of the intermediate images generated by the intermediate image generating means 140, and the candidate parameter sets $C_i$ nominated by the candidate nominating means 116 for the respective divisional images.

Figure 8:
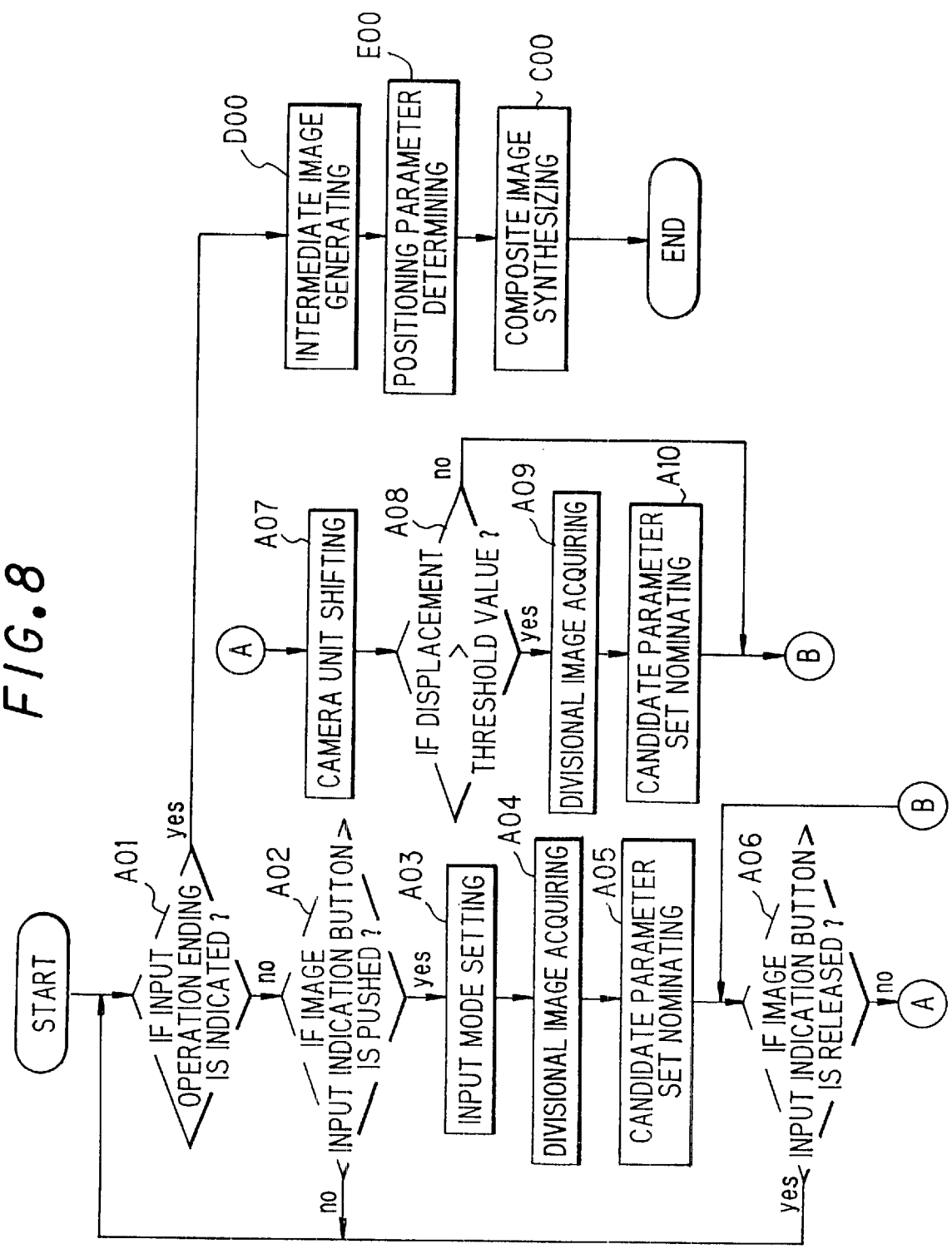
FIG. 8 is a flowchart illustrating operational steps of the image input system according to the second embodiment.

FIG. 8 is a flowchart illustrating operational steps of the image input system according to the second embodiment having a similar configuration to the flowchart of FIG. 4, wherein the positioning parameter determining step B00 of FIG. 4 is replaced with an intermediate image generating step D00 and a positioning parameter determining step E00.

After all the divisional images are acquired ("yes" at step A01), an intermediate image 05 is synthesized for each of the main divisional images 04 from the main divisional image 04 and a sequence of divisional images 03 following the main divisional image 04 at step D00, in a similar way with the first embodiment, and at step E00, matching operation is performed between two intermediate images 05 and the positioning parameters of the divisional images 03 are revised according to the results of the matching operation.

Figure 9:
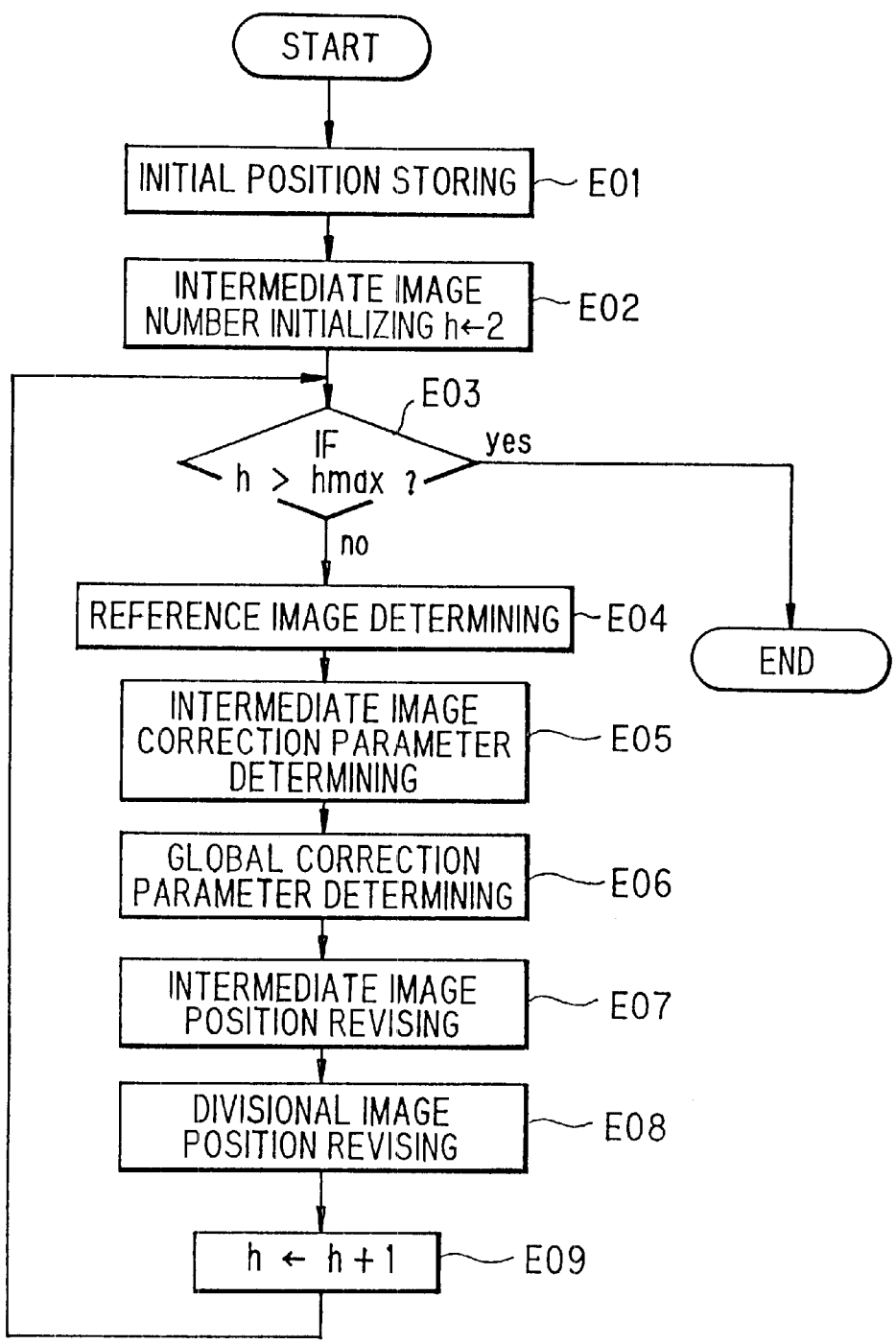
FIG. 9 is a flowchart illustrating detailed steps of the positioning parameter determining step E00 of FIG. 8.

FIG. 9 is a flowchart illustrating detailed steps of the positioning parameter determining step E00 of FIG. 8 performed in a similar way with steps of FIG. 5 by the positioning parameter determining means 114, wherein a step E08 for revising the positioning parameters of the sequence of the divisional images 03 included the intermediate image 05 is added.

Referring to FIG. 9, the positioning parameter determining step E00 comprises a present position storing step E01, an intermediate image number initializing step E02, a process ending detecting step E03, a reference image determining step E04, an intermediate image correction parameter determining step E05, a global correction parameter determining step E06, an intermediate image position revising step E07, a divisional image position revising step E08, and an intermediate image number revising step E09.

Now, detailed operation of the second embodiment is described.

Figure 10:
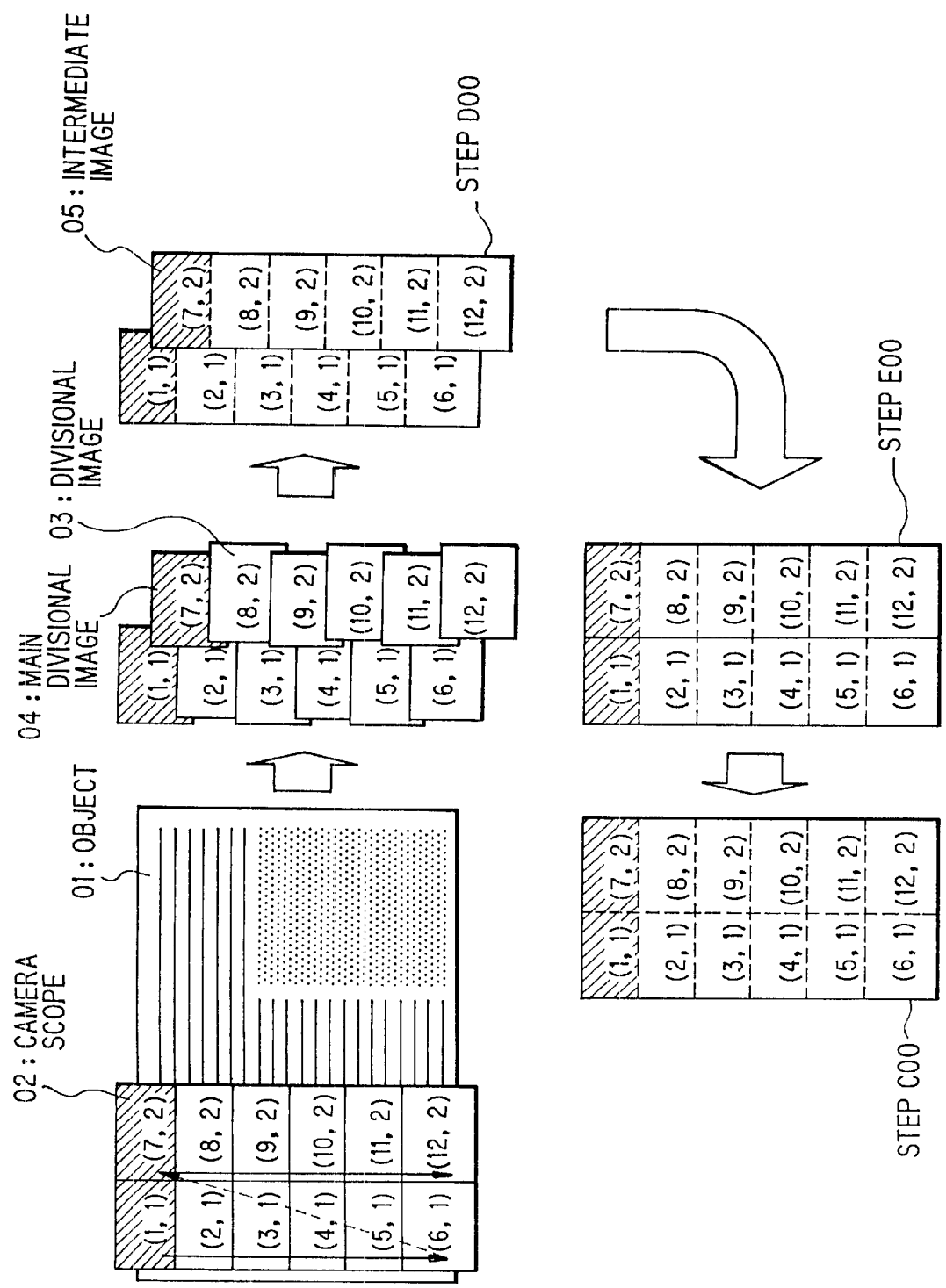
FIG. 10 is a schematic diagram illustrating generation of the intermediate images 05 and the positioning parameter determination making use of matching operation applied to the intermediate images 05.

FIG. 10 is a schematic diagram illustrating generation of the intermediate images 05 and the positioning parameter determination making use of matching operation applied to the intermediate images 05.

As beforehand described, divisional images 03 of a specific group g are automatically acquired in a stroke of the camera unit in a fixed direction so that two successive divisional images 03 overlaps. Therefore, a high precision positioning of a divisional image 03(i,g) can be realized by performing matching operation by selecting the preceding divisional image 03(i−1,g) as the reference image 03(k,g).

On the other side, positioning of a sequence of the divisional images 03 is deeply affected with the position of their main divisional image 04, when preceding images are used as the reference images. Therefore, when errors included in the acquisition position of the main divisional image 04 cannot be corrected sufficiently, quality of the composite image may be degraded due to mismatch between the groups. The main divisional image 04 is acquired after large displacement of the camera unit, and so, larger errors are possible to be included in the acquisition position of the main divisional image 04.

In the first embodiment, these errors are canceled by nominating a larger candidate parameter set $C_i$ for each main divisional image 04. In the second embodiment, the method of the first embodiment is extended so that a correct positioning can be performed even if the main divisional image 04 is a monotonous image such as a blank.

As shown in FIG. 10, divisional images 03 having a specific group number g are synthesized (at step D00) in an intermediate image 05 in reference to their main divisional image 04.

As there is surely an overlap between two divisional images 03 in the same group number g, the intermediate images 05 call be synthesized with high precision. Then, positioning parameters are determined for the intermediate images 05 (at step E00) in a similar way as determined for the divisional images 03 in the first embodiment. Therefore, the composite image can be synthesized (at step C00) with high precision, even when the main divisional image 04 has a monotonous pattern such as a blank.

Figure 11:
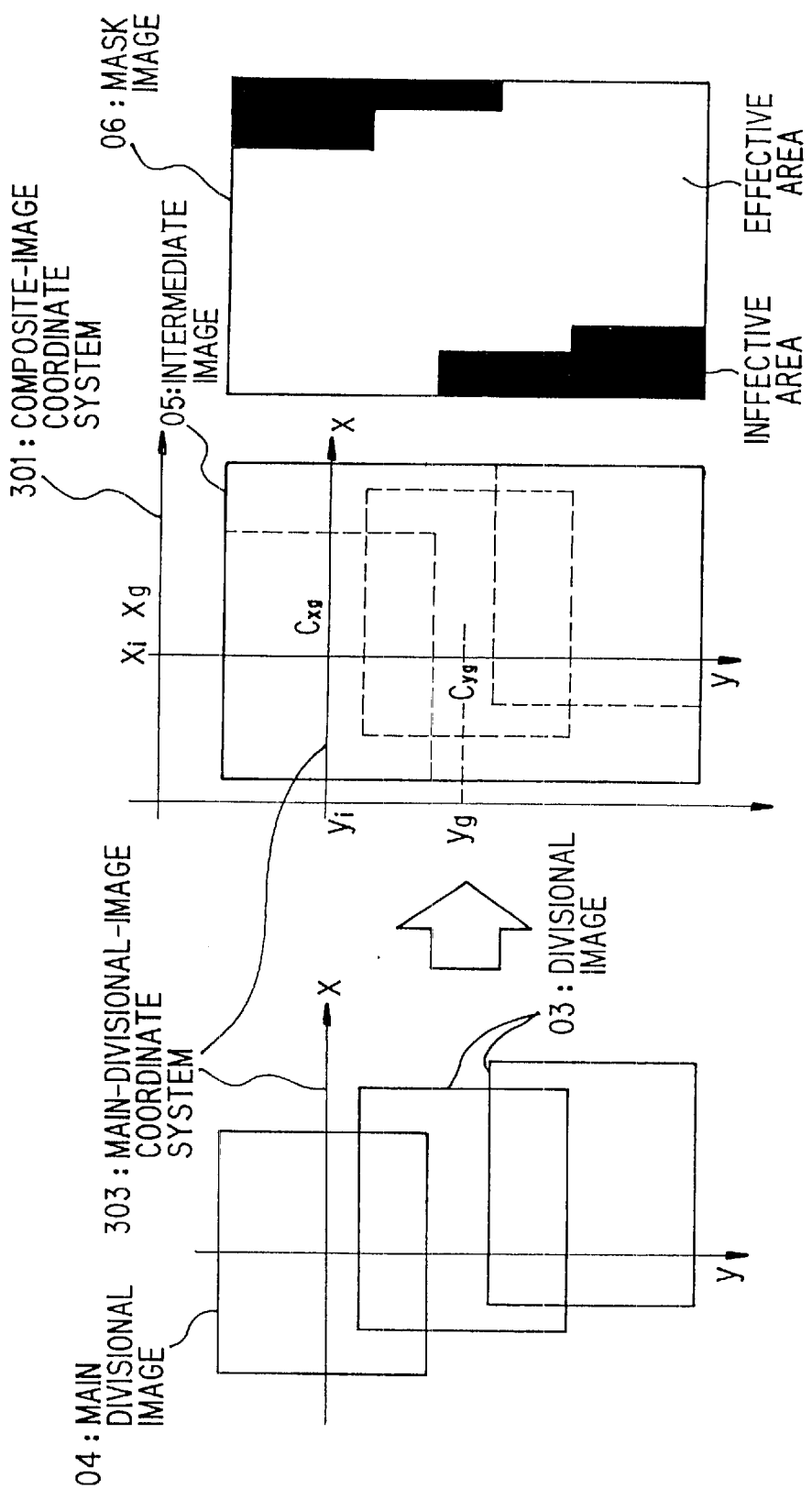
FIG. 11 is a graphic chart illustrating synthesis of the intermediate image 05.

FIG. 11 is a graphic chart illustrating synthesis of the intermediate image 05.

At step D00 of FIG. 8, an intermediate positioning parameter $(x'_j, y'_j, \theta'_j)$ is determined for each divisional image 03 of each group g, on a coordinate system 303 of their main divisional image 04. Referring to the intermediate positioning parameter $(x'_j, y'_j, \theta'_j)$, an intermediate image 05 is synthesized so as to have a minimum rectangular frame including all the divisional images 03 of the concerning group g, as shown in FIG. 11. The intermediate images 05 thus synthesized are stored in the image memory 118, and their positions $(X_g, Y_g, \Theta_g)$ and sizes $(Sx_g, Sy_g)$ on the composite-image coordinate system 301 are stored in the image attribution memory 119.

At the same time, a mask image 06 as shown in FIG. 11 is also generated for each intermediate image 05 and stored in the image memory 118. The masks image 06 represents an effective area having pixels to be processed and all ineffective area having pixels to be neglected of respective intermediate image 05. The matching operation at step E00 is performed concerning only the effective area referring to the mask image 06. As to usage of the mask image 06, details are described in "Image Processing Handbook", published by SHOHKOHDOH, 1987, pp. 252 to 254, and detailed descriptions are omitted.

The mask image 06 is a binary image having the same size with corresponding intermediate image 05, wherein pixel value of '0' and '1' at coordinate (x,y) indicates effective and ineffective pixel of the corresponding intermediate image 05, respectively. The ineffective pixels may be represented by giving a specific value, −1, for example, to pixel values themselves of the intermediate image 05.

The size $(Sx_g, Sy_g)$ and the position $(X_g, Y_g, \Theta_g)$ on the composite-image coordinate system 301 of the intermediate image 05 are calculated as follows.

From the size (Sx,Sy), coordinates of four corners of each divisional image 03(i,g) on the respective divisional-image coordinate system 302 are represented as follows;

$$\left(-\frac{Sx}{2}, -\frac{Sy}{2}\right),$$

$$\left(-\frac{Sx}{2}, \frac{Sy}{2}\right),$$

$$\left(\frac{Sx}{2}, \frac{Sy}{2}\right), \text{ and}$$

$$\left(\frac{Sx}{2}, -\frac{Sy}{2}\right).$$

By applying the intermediate positioning parameter $(x'_j, y'_j, \theta'_j)$ of the divisional image 03(j,g), the coordinates of the four corners are transformed on the main-divisional-image coordinate system 303 as follows;

$$\left(-\frac{Sx}{2}\cos\theta'_j + \frac{Sy}{2}\sin\theta' j + x'_j, -\frac{Sx}{2}\sin\theta'_j - \frac{Sy}{2}\cos\theta' j + y'_j\right),$$

-continued $$\left(-\frac{Sx}{2}\cos\theta'_j - \frac{Sy}{2}\sin\theta' j + x'_j, -\frac{Sx}{2}\sin\theta'_j + \frac{Sy}{2}\cos\theta' j + y'_j\right),$$

$$\left(\frac{Sx}{2}\cos\theta'_j - \frac{Sy}{2}\sin\theta' j + x'_j, \frac{Sx}{2}\sin\theta'_j + \frac{Sy}{2}\cos\theta' j + y'_j\right), \text{ and}$$

$$\left(\frac{Sx}{2}\cos\theta'_j + \frac{Sy}{2}\sin\theta' j + x'_j, \frac{Sx}{2}\sin\theta'_j - \frac{Sy}{2}\cos\theta' j + y'_j\right).$$

From these coordinates on the main-divisional-image coordinate system 303, the size $(Sx_g, Sy_g)$ of the intermediate image 05 is obtained as follows;

$$Sx_g = \max_{j \in g}\{\max(\{CX\})\} - \min_{j \in g}\{\min(\{CX\})\},$$

$$Sy_g = \max_{j \in g}\{\max(\{CY\})\} - \min_{j \in g}\{\min(\{CY\})\}.$$

Here, {CX} is a set of X-coordiniates of the four corners on the main-divisional-image coordinate system 303, {CY} is that of Y-coordinates and jɛg means divisional images 03(j,g) included in the group g.

In the same way, a center $(Cx_g, Cy_g)$ of the intermediate image 05 on the main-divisional-image coordinate system 303 is given as follows;

$$Cx_g = \frac{1}{2}\left[\max_{j \in g}\{\max(\{CX\})\} + \min_{j \in g}\{\min(\{CX\})\}\right],$$

$$Cy_g = \frac{1}{2}\left[\max_{j \in g}\{\max(\{CY\})\} + \min_{j \in g}\{\min(\{CY\})\}\right].$$

From the center $(Cx_g, Cy_g)$ and the positioning parameter $(x_i, y_i, \theta_i)$ of the main divisional image 04 oil the composite-image coordinate system 301, the position $(X_g, Y_g, \Theta_g)$ of the intermediate image 05 on the composite-image coordinate system becomes as follows;

$$X_g = x_i + Cx_g \times \cos\theta_i - Cy_g \times \sin\theta_i,$$

$$Y_g = y_i + Cx_g \times \sin\theta_i + Cy_g \times \cos\theta_i,$$

Thus, the intermediate image 05 is generated at step D00 for every group, and the positioning parameter is determined (at step E00) for each of the intermediate images 05.

Referring to FIG. 9, the position $(X_g, Y_g, \Theta_g)$ of every of the intermediate images 05 is read out by the positioning parameter determining means 114 from the image attribution memory 119 and stored in the candidate nominating means 116 (at step E01), a variable h representing a concerning intermediate image 05 is initialized into 2 (at step E02), and it is checked (at step E03) whether all the intermediate images 05 are processed or not.

Then the positioning parameter determining means 114 selects a reference image (at step E04) for determining the positioning parameter of a concerning intermediate image 05(h). The reference image may be the intermediate-image 05(h−1) lastly generated, or may be an intermediate image already generated and having a largest overlap with the concerning intermediate image 05(h). A partially synthesized composite image may be used as the reference image as described in connection with the first embodiment, by synthesizing the composite image successively from intermediate images processed one by one.

Then, the positioning parameter determining means 114 determines the correction parameter of the concerning intermediate image 05(h) (at step E05) in a similar way as performed in step B05 of FIG. 5 in relation to the reference image making use of the matching operation, referring also to a corresponding mask image 06(h).

As to the matching operation, any appropriate method, such as the method disclosed in the Provisional Publication No. 56060/'98, may be applied as described in connection with the first embodiment. As to the candidate parameter set $C_h$, the candidate parameter set nominated for the respective main divisional image 04 may be applied.

Then, the positioning parameter determining means 114 calculates the global correction parameter of the intermediate image 05(h) (at step E06) from the positioning parameter of the reference image, revises the position $(X_h, Y_h, \Theta_h)$ of the intermediate image 05(h) (at step E07), and revises the position of each divisional image 03 included in the intermediate image 05(h) as $A \times R \times I_P$, wherein A, R and $I_P$ are the rigid-body transformations of the global correction parameter of the intermediate image 05(h), the correction parameter of the intermediate image 05(h) and the intermediate positioning parameter calculated at step D00 of each divisional image 03 included in the intermediate image 05(h), respectively.

The revised position $A \times R \times I_P$ of each divisional image 03 is stored in the image attribution memory 119 as the positioning parameter thereof.

By incrementing the variable h (at step E09), steps E03 to E09 are repeated for each of the intermediate images 05(1) to 05(h), and the correct positioning parameters are determined for all the divisional images 03(1, 1) to 03(i,g).

Returning to FIG. 8, the image synthesizing means 115 synthesizes the composite image (at step C00) from the divisional images 03(1, 1) to 03(i,9) stored in the image memory 118 referring to respective positioning parameters thus prepared in the image attribution memory 119.

Thus, the composite image can be synthesized precisely according to the second embodiment even when the main divisional image is a monotonous image such as a blank.

In the flowchart of FIG. 8, the intermediate image generating step D00 is described to be performed after all the divisional images 03 are acquired. However, the intermediate image 05 may be synthesized one by one each time when a sequence of divisional images 03 are acquired by each stroke of the camera unit, that is, each time when the image input indication button 201 is released. In the case, the intermediate image generating step D00 is performed just after the button release checking step A06 ("yes").

In the above examples of the first and the second embodiment, minimum necessary correction parameters of the positioning parameter of the divisional image 03 are considered as the candidate parameter set $C_i$. However, a method of matching operation to be applied to determine the positioning parameter may be also nominated in the candidate parameter set $C_i$. For example, the "sum of absolute difference" method giving high-speed calculation may be nominated to the ordinary divisional images 03 while nominating the cross-correlation method giving high-precision matching to the main divisional images 04.

Figure 12:
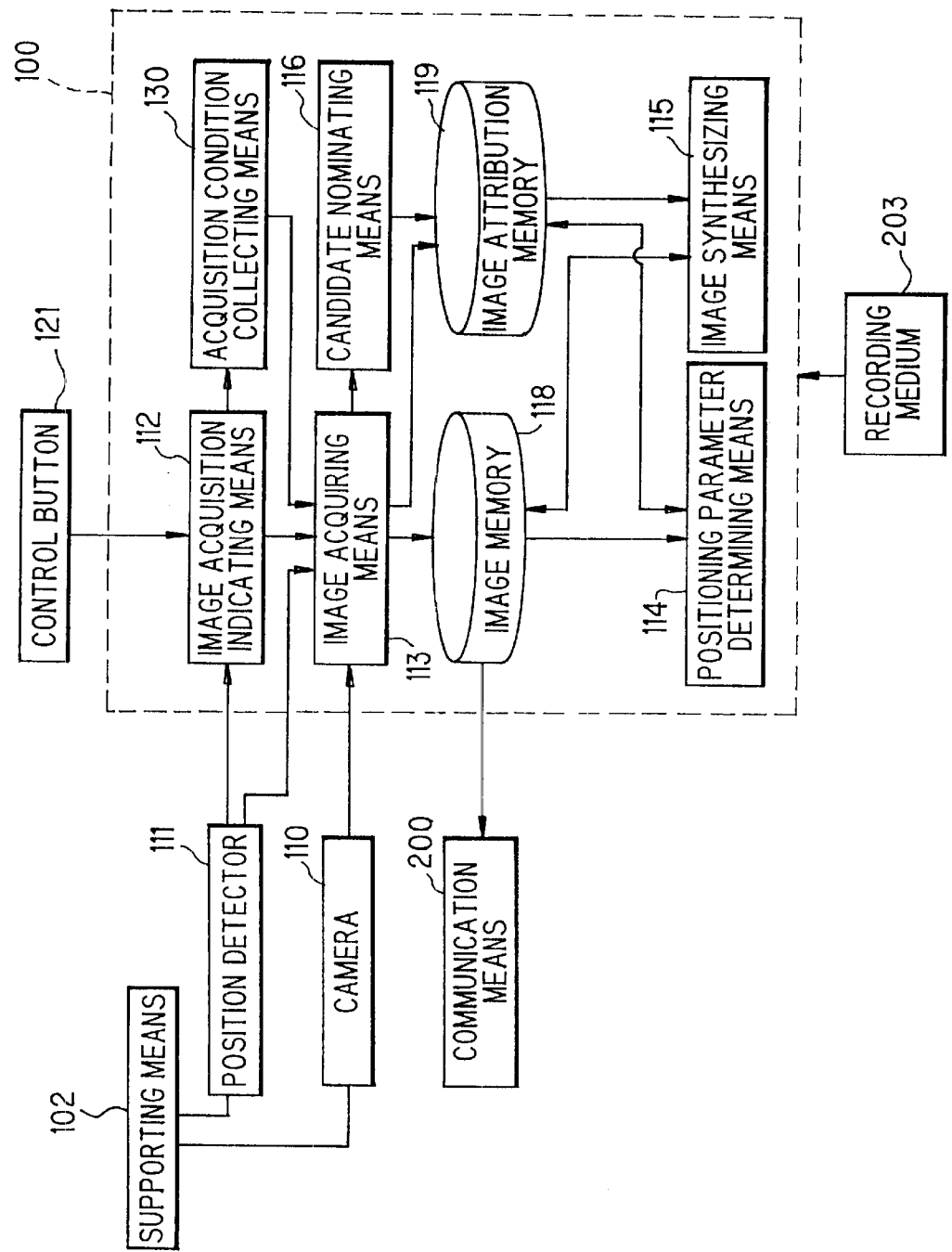
FIG. 12 is a block diagram illustrating the image input system according to a third embodiment of the invention.
Figure 13:
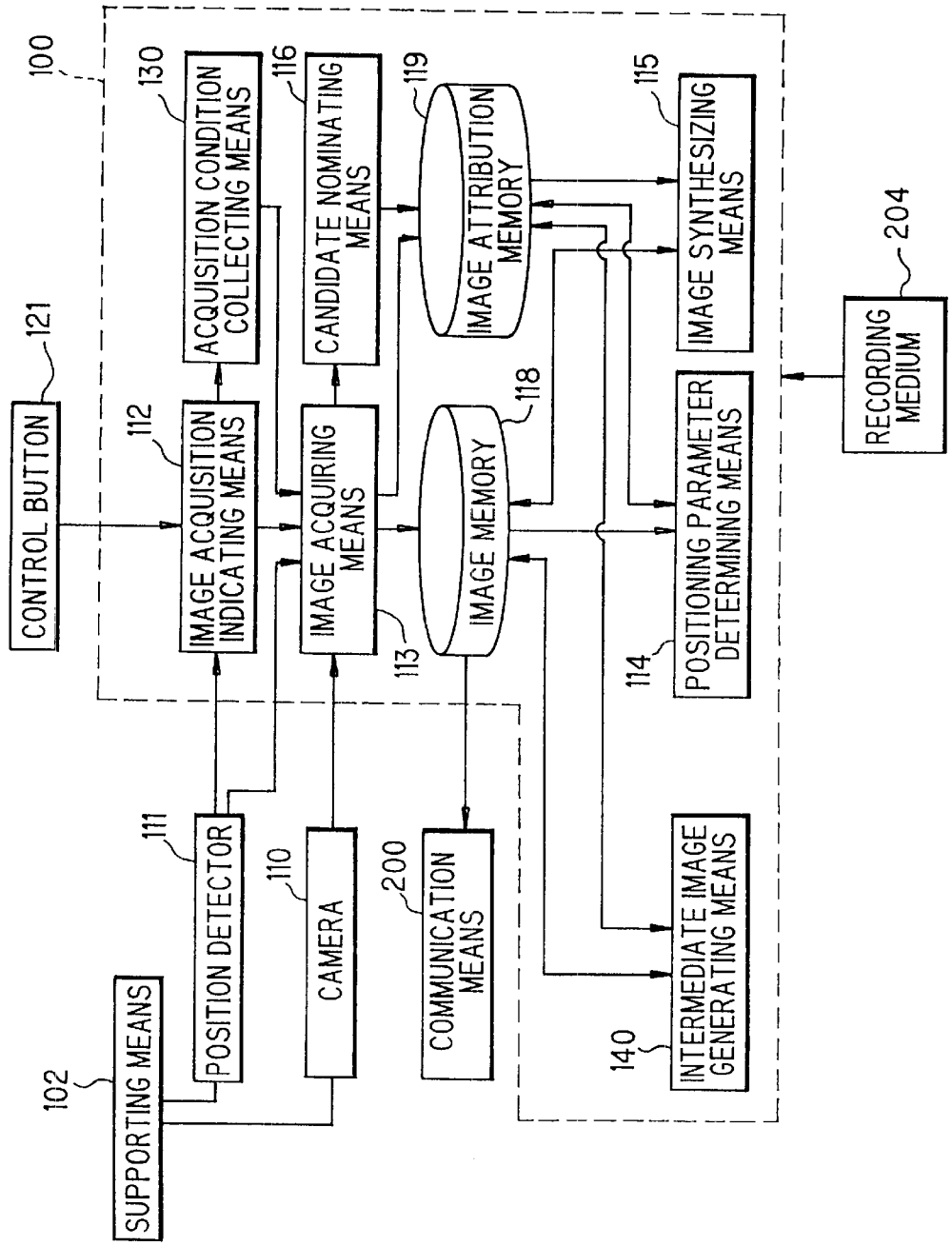
FIG. 13 is a block diagram illustrating the image input system according to a fourth embodiment of the invention.

Heretofore, the image input system of the invention is described in connection with the block diagrams of FIG. 1 and FIG. 7, wherein each component is illustrated as an individual functional block. However, the image acquisition indicating means 112, the image acquiring means 113, the positioning parameter determining means 114, the image synthesizing means 115, candidate nominating means 116 and the acquisition condition collecting means 130 of FIGS. 1 and 7, and the intermediate image generating means 140 of FIG. 7 may be realized with a computer program recorded in a recording medium 204 to be implemented in a data processor 100 having a memory device working as the image memory 118 and the image attribution memory 119, such as illustrated in FIGS. 12 and 13.

As heretofore described, the divisional images 03 are acquired, sequence by sequence, by repeating a sliding movement of the camera unit in a certain direction from a distant point to a near point according to natural movement of user's arm, and the candidate parameter set is nominated for each of the divisional images 03 in consideration of characteristics of this natural movement. Therefore, a composite image of desired scope can be obtained at high speed and with high precision, according to the image input system of the invention.

What is claimed is:

1. An image input system for synthesizing a composite image of an object from a plurality of divisional images which are acquired from the object by a camera by displacing the camera; the image input system comprising:

a position detector for detecting a present position of the camera;

a supporting means for supporting the camera to be movable on the object maintaining a fixed distance to the object, and unitizing the position detector and the camera;

an image acquisition indicating means for generating an image acquisition indication referring to the present position of the camera detected by the position detector, each of the divisional images being acquired according to the image acquisition indication automatically at fixed intervals so as to have an overlap with another of the divisional images; and an image acquiring means for acquiring each of the divisional images according to the image acquisition indication generated by the image acquisition indicating means, and storing the divisional images together with attribution information of the divisional images.

2. An image input system comprising:

a camera;

a position detector for detecting a present position of the camera;

a supporting means for supporting the camera to be movable on an object maintaining a fixed distance to the object, and unitizing the position detector and the camera;

an image acquisition indicating means for generating an image acquisition indication referring to the present position of the camera detected by the position detector, each of a plurality of divisional images being acquired according to the image acquisition indication automatically at fixed intervals so as to have an overlap with another of the divisional images;

an acquisition condition collecting means for collecting acquisition condition information of each of the divisional images according to the image acquisition indication generated by the image acquisition indicating means;

a candidate nominating means for nominating a candidate parameter set according to the acquisition condition information collected by the acquisition condition collecting means;

an image acquiring means for acquiring each of the divisional images according to the image acquisition indication generated by the image acquisition indicating means, and storing the divisional images together with attribution information of the divisional images and the acquisition condition information collected by the acquisition condition collecting means;

a positioning parameter determining means for determining a positioning parameter for each of the divisional images, through finding a most appropriate correction parameter among correction parameters included in the candidate parameter set; and an image synthesizing means for synthesizing a composite image of the object by assembling each of the divisional images according to the positioning parameter determined for respective each of the divisional images by the positioning parameter determining means.

3. An image input system comprising:

a camera;

a position detector for detecting a present position of the camera;

a supporting means for supporting the camera to be movable on an object maintaining a fixed distance to the object, and unitizing the position detector and the camera;

an image acquisition indicating means for generating an image acquisition indication and an acquisition position of each of a plurality of divisional images through determining timings to acquire the divisional images according to the present position of the camera detected by the position detector and a status of a control button provided for a user to control image input operation, the acquisition position of each of the divisional images being the present position of the camera at a timing to acquire respective each of the divisional images;

an acquisition condition collecting means for collecting acquisition condition information of each of the divisional images according to the image acquisition indication generated by the image acquisition indicating means;

a candidate nominating means for nominating a candidate parameter set according to the acquisition condition information collected by the acquisition condition collecting means;

an image acquiring means for acquiring each of the divisional images according to the image acquisition indication generated by the image acquisition indicating means, and storing the divisional images together with attribution information of the divisional images;

a positioning parameter determining means for determining a positioning parameter for each of the divisional images, through applying matching operation to the divisional images according to the attribution information and the candidate parameter set of each of the divisional images; and an image synthesizing means for synthesizing a composite image of the object by assembling each of the divisional images according to the positioning parameter determined for respective each of the divisional images by the positioning parameter determining means.

4. An image input system as recited in one of claims 1 to 3; wherein the image acquisition indicating means is configured to automatically determine a timing to acquire one of the divisional images according to the present position of the camera actually detected by the position detector and the present position of the camera detected by the position detector when preceding one of the divisional images is acquired.

5. An image input system as recited in one of claims 2 to 3, wherein:

the acquisition condition information includes information indicating whether a respective one of the divisional images is a first or not of a sequence of the divisional images which are acquired automatically at fixed intervals with one movement of the camera; and the candidate nominating means nominates the candidate parameter set differently according to whether the respective one of the divisional images is a first or not of a sequence of the divisional images which are acquired automatically at fixed intervals with one movement of the camera, referring to the acquisition condition information.

6. An image input system as recited in one of claims 2 to 3, wherein:

an intermediate image generating means is further comprised for generating intermediate images, each of the intermediate images being synthesized from a sequence of the divisional images which are acquired automatically at fixed intervals with one movement of the camera; and the positioning parameter determining means determines the positioning parameter for each of the divisional images, through further applying a matching operation to the intermediate images generated by the intermediate image generating means.

7. An image input system as recited in one of claims 1 to 3; wherein the divisional images are acquired being divided into more than one sequences, the divisional images of each of the sequences representing one of rectangular strips into which the object is to be divided and being acquired at fixed intervals with one movement in a direction of the camera which is unitized with the position detector by the supporting means.

8. An image input system as recited in one of claims 1 to 3; wherein a mouse-type pointing device is applied to the position detector.

9. The image input system of claim 4, wherein:

the acquisition condition information includes information indicating whether a respective one of the divisional images is a first or not of a sequence of the divisional images which are acquired automatically at fixed intervals with one movement of the camera; and the candidate nominating means nominates the candidate parameter set differently according to whether the respective one of the divisional images is a first or not of a sequence of the divisional images which are acquired automatically at fixed intervals with one movement of the camera, referring to the acquisition condition information.

10. The image input system of claim 4, wherein:

an intermediate image generating means is further comprised for generating intermediate images, each of the intermediate images being synthesized from a sequence of the divisional images which are acquired automatically at fixed intervals with one movement of the camera; and the positioning parameter determining means determines the positioning parameter for each of the divisional images, through further applying a matching operation to the intermediate images generated by the intermediate image generating means.

11. The image input system of claim 5, wherein:

an intermediate image generating means is further comprised for generating intermediate images, each of the intermediate images being synthesized from a sequence of the divisional images which are acquired automatically at fixed intervals with one movement of the camera; and the positioning parameter determining means determines the positioning parameter for each of the divisional images, through further applying a matching operation to the intermediate images generated by the intermediate image generating means.

12. The image input system of claim 4, wherein the divisional images are acquired being divided into more than one sequences, the divisional images of each of the sequences representing one of rectangular strips into which the object is to be divided and being acquired at fixed intervals with one movement in a direction of the camera which is unitized with the position detector by the supporting means.

13. The image input system of claim 5, wherein the divisional images are acquired being divided into more than one sequences, the divisional images of each of the sequences representing one of rectangular strips into which the object is to be divided and being acquired at fixed intervals with one movement in a direction of the camera which is unitized with the position detector by the supporting means.

14. The image input system of claim 6, wherein the divisional images are acquired being divided into more than one sequences, the divisional images of each of the sequences representing one of rectangular strips into which the object is to be divided and being acquired at fixed intervals with one movement in a direction of the camera which is unitized with the position detector by the supporting means.

15. The image input system of claim 4, wherein a mouse-type pointing device is applied to the position detector.

16. The image input system of claim 5, wherein a mouse-type pointing device is applied to the position detector.

17. The image input system of claim 6, wherein a mouse-type pointing device is applied to the position detector.

18. The image input system of claim 7, wherein a mouse-type pointing device is applied to the position detector.

19. A recording medium wherein a computer program is recorded; the computer program comprising program steps for a computer performing functions of:

an image acquisition indicating means for generating an image acquisition indication referring to a present position of a camera detected by a position detector, each of a plurality of divisional images being acquired according to the image acquisition indication automatically at fixed intervals so as to have an overlap with another of the divisional images; and an image acquiring means for acquiring each of the divisional images according to the image acquisition indication generated by the image acquisition indicating means, and storing the divisional images together with attribution information of the divisional images.

20. A recording medium wherein a computer program is recorded; the computer program comprising program steps for a computer performing functions of:

an image acquisition indicating means for generating an image acquisition indication referring to a present position of a camera detected by a position detector, each of a plurality of divisional images being acquired according to the image acquisition indication automatically at fixed intervals so as to have an overlap with another of the divisional images;

an acquisition condition collecting means for collecting acquisition condition information of each of the divisional images according to the image acquisition indication generated by the image acquisition indicating means;

a candidate nominating means for nominating a candidate parameter set according to the acquisition condition information collected by the acquisition condition collecting means;

an image acquiring means for acquiring each of the divisional images according to the image acquisition indication generated by the image acquisition indicating means, and storing the divisional images together with attribution information of the divisional images and the acquisition condition information collected by the acquisition condition collecting means;

a positioning parameter determining means for determining a positioning parameter for each of the divisional images, through finding a most appropriate correction parameter among correction parameters included in the candidate parameter set; and an image synthesizing means for synthesizing a composite image by assembling each of the divisional images according to the positioning parameter determined for respective each of the divisional images by the positioning parameter determining means.

21. A recording medium wherein a computer program is recorded; the computer program comprising program steps for a computer performing functions of:

an image acquisition indicating means for generating an image acquisition indication and an acquisition position of each of a plurality of divisional images through determining timings to acquire the divisional images according to a present position of a camera detected by a position detector and a status of a control button provided for a user to control image input operation, the acquisition position of each of the divisional images being the present position of the camera at a timing to acquire respective each of the divisional images;

an acquisition condition collecting means for collecting acquisition condition information of each of the divisional images according to the image acquisition indication generated by the image acquisition indicating means;

a candidate nominating means for nominating a candidate parameter set according to the acquisition condition information collected by the acquisition condition collecting means;

an image acquiring means for acquiring each of the divisional images according to the image acquisition indication generated by the image acquisition indicating means, and storing the divisional images together with attribution information of the divisional images;

a positioning parameter determining means for determining a positioning parameter for each of the divisional images, through applying matching operation to the divisional images according to the attribution information and the candidate parameter set of each of the divisional images; and an image synthesizing means for synthesizing a composite image by assembling each of the divisional images according to the positioning parameter determined for respective each of the divisional images by the positioning parameter determining means.

22. A recording medium wherein a computer program is recorded; the computer program comprising program steps for a computer performing functions of:

an image acquisition indicating means for generating an image acquisition indication and an acquisition position of each of a plurality of divisional images through determining timings to acquire the divisional images according to a present position of a camera detected by a position detector and a status of a control button provided for a user to control image input operation, the acquisition position of each of the divisional images being the present position of the camera at a timing to acquire respective each of the divisional images;

an acquisition condition collecting means for collecting acquisition condition information of each of the divisional images according to the image acquisition indication generated by the image acquisition indicating means;

a candidate nominating means for nominating a candidate parameter set according to the acquisition condition information collected by the acquisition condition collecting means;

an image acquiring means for acquiring each of the divisional images according to the image acquisition indication generated by the image acquisition indicating means, and storing the divisional images together with attribution information of the divisional images;

an intermediate image generating means for generating intermediate images, each of the intermediate images being synthesized from a sequence of the divisional images which are acquired automatically at fixed intervals with one movement of the camera;

a positioning parameter determining means for determining a positioning parameter for each of the divisional images, through applying matching operation to the intermediate images generated by the intermediate image generating means, and an image synthesizing means for synthesizing a composite image by assembling each of the divisional images according to the positioning parameter determined for respective each of the divisional images by the positioning parameter determining means.

\* \* \* \* \*

UNITED STATES PATENT AND TRADEMARK OFFICE
CERTIFICATE OF CORRECTION

PATENT NO. : 6,459,819 B1 Page 1 of 1
DATED : October 1, 2002
INVENTOR(S) : Toshiyasu Nakao It is certified that error appears in the above-identified patent and that said Letters Patent is hereby corrected as shown below:

Column 11,
Line 19, delete "g_1" insert -- $g_{I\_1}$ --
Line 42, delete "θ≧10" insert -- $\theta \leq 10$ --
Line 46, delete "θ≧3" insert -- $\theta \leq 3$ --

Column 12,
Line 19, delete "Ynot" insert -- know --

Column 13,
Line 26, delete "j+2" insert -- j←2 --

Column 14,
Line 39, equation 3, delete "k" insert -- $k_I$ --
Line 42, equation 4, delete "$K_I^{-1}$" insert -- $K_I^{-1}$ --

Column 16,
Line 7, delete "he" insert -- the --
Line 21, equation 8, delete "$K_I$" insert -- $K_I$ --

Column 20,
Line 34, delete "oil" insert -- on --
Line 41, after "$\cos\theta_I$" insert -- $\Theta, =\theta_I$ --

Column 21,
Line 31, delete "(I,9)" insert -- (I,g) --

Signed and Sealed this

Sixteenth Day of December, 2003

JAMES E. ROGAN
*Director of the United States Patent and Trademark Office*